US012217627B1

(12) United States Patent
Smith et al.

(10) Patent No.: US 12,217,627 B1
(45) Date of Patent: Feb. 4, 2025

(54) APPARATUS AND METHOD FOR DETERMINING ACTION GUIDES

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/398,446

(22) Filed: Dec. 28, 2023

(51) Int. Cl.
*G06Q 10/0639* (2023.01)
*G06Q 10/0633* (2023.01)
*G09B 5/02* (2006.01)
*G06N 20/00* (2019.01)

(52) U.S. Cl.
CPC ........... *G09B 5/02* (2013.01); *G06Q 10/0633* (2013.01); *G06Q 10/0639* (2013.01); *G06N 20/00* (2019.01)

(58) Field of Classification Search
CPC .................................................... G06Q 10/063
IPC .................................................. G06Q 10/0633
See application file for complete search history.

(56) References Cited

U.S. PATENT DOCUMENTS

| 7,930,396 | B2 * | 4/2011 | Trinon | H04L 41/06 709/224 |
| 9,785,904 | B2 | 10/2017 | Feder | |
| 11,367,032 | B2 | 6/2022 | Doi | |
| 2009/0192867 | A1 * | 7/2009 | Farooq | G06Q 30/0201 705/7.29 |
| 2014/0343999 | A1 * | 11/2014 | Kim | G06Q 10/06313 705/7.23 |
| 2015/0006225 | A1 | 1/2015 | S | |
| 2017/0364845 | A1 * | 12/2017 | Dahn | G06Q 10/0633 |
| 2022/0261721 | A1 | 8/2022 | Rajasekharan | |

FOREIGN PATENT DOCUMENTS

| CN | 110490442 A | 11/2019 |
| CN | 113610408 A | 11/2021 |
| CN | 113807596 B | 12/2022 |

OTHER PUBLICATIONS

S. M. Avdoshin and E. Y. Pesotskaya, "Software risk management," 2011 7th Central and Eastern European Software Engineering Conference (CEE-SECR), Moscow, Russia, 2011, pp. 1-6, doi: 10.1109/CEE-SECR.2011.6188471. (Year: 2011).*

* cited by examiner

*Primary Examiner* — Rutao Wu
*Assistant Examiner* — Zahra Elkassabgi
(74) *Attorney, Agent, or Firm* — Caldwell Intellectual Property Law

(57) ABSTRACT

Apparatus and method for determining action guides is disclosed. The apparatus includes at least a processor and a memory communicatively connected to the at least a processor, wherein the memory contains instructions configuring the at least a processor to receive a user action, wherein the user action includes a user usage, convert the user usage of the user action into a current usage, obtain action template data, wherein the action template data includes a template usage, generate a template action expectation as a function of the user action and the action template data, determine an action feasibility as a function of the current usage and the template action expectation and generate an action guide as a function of the action feasibility.

20 Claims, 8 Drawing Sheets

APPARATUS AND METHOD FOR DETERMINING ACTION GUIDES

FIELD OF THE INVENTION

The present invention generally relates to the field of action guides. In particular, the present invention is directed to apparatus and method for determining action guides.

BACKGROUND

Evaluation of user action in real time can be difficult. Existing technologies do not adequately utilize data processing to leverage existing reference data in order to provide evaluations of user actions.

SUMMARY OF THE DISCLOSURE

In an aspect, apparatus for determining action guides is disclosed. The apparatus includes at least a processor and a memory communicatively connected to the at least a processor, wherein the memory contains instructions configuring the at least a processor to receive a user action, wherein the user action includes a user usage, convert the user usage of the user action into a current usage, obtain action template data, wherein the action template data includes a template usage, generate a template action expectation as a function of the user action and the action template data, determine an action feasibility as a function of the current usage and the template action expectation and generate an action guide as a function of the action feasibility.

In another aspect, method for determining action guides is disclosed. The method includes receiving, using at least a processor, a user action, wherein the user action includes a user usage, converting, using the at least a processor, the user usage of the user action into a current usage, obtaining, using the at least a processor, action template data, wherein the action template data includes a template usage, generating, using the at least a processor, a template action expectation as a function of the user action and the action template data, determining, using the at least a processor, an action feasibility as a function of the current usage and the template action expectation and generating, using the at least a processor, an action guide as a function of the action feasibility.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for determining action guides is disclosed. The apparatus includes at least a processor and a memory communicatively connected to the at least a processor, wherein the memory contains instructions configuring the at least a processor to receive a user action, wherein the user action includes a user usage, convert the user usage of the user action into a current usage, obtain action template data, wherein the action template data includes a template usage, generate a template action expectation as a function of the user action and the action template data, determine an action feasibility as a function of the current usage and the template action expectation and generate an action guide as a function of the action feasibility. Exemplary embodiments illustrating aspects of the present disclosure are described below in the context of several specific examples.

Figure 1:
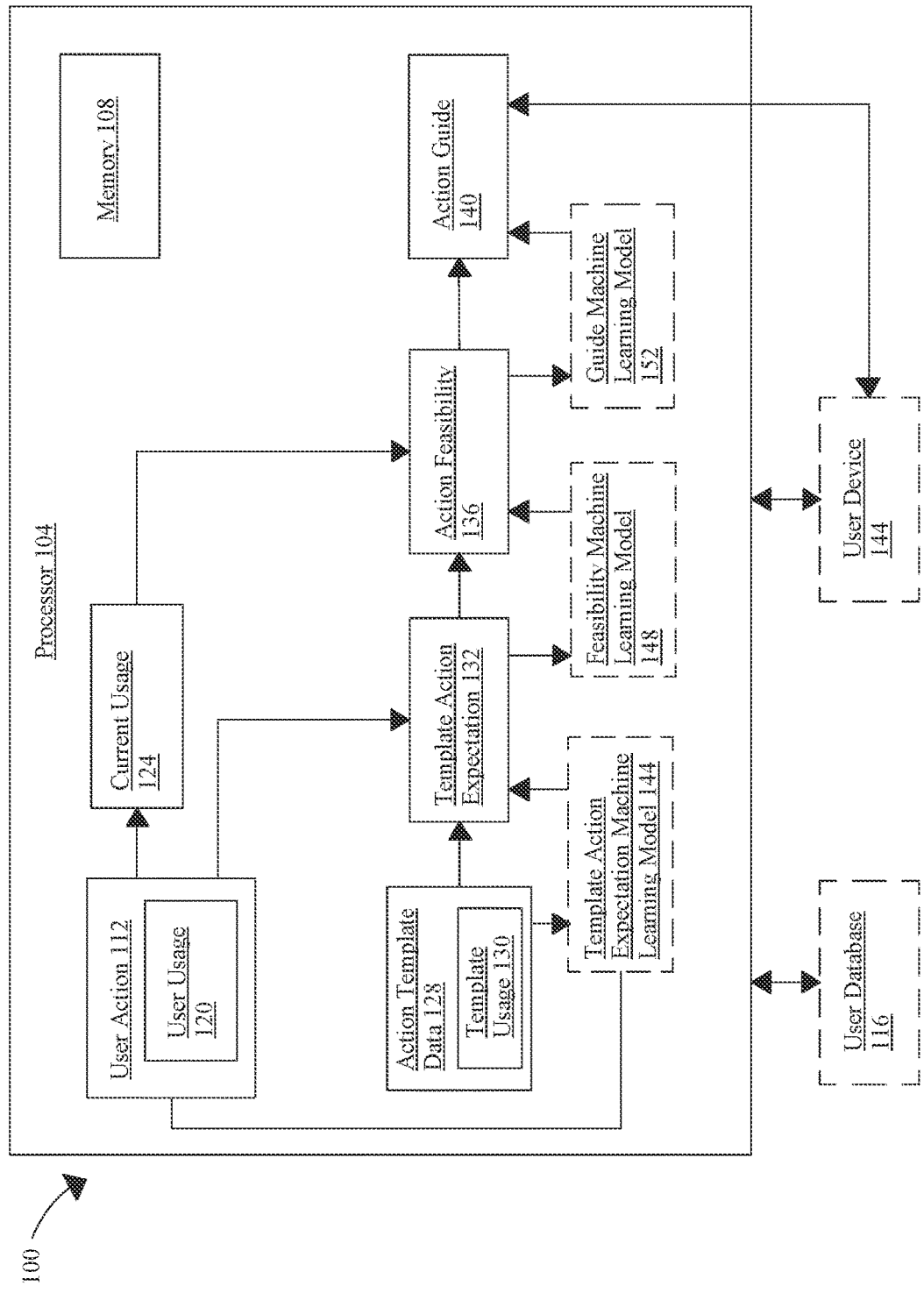
FIG. 1 illustrates a block diagram of an exemplary embodiment of apparatus for determining action guides.

Referring now to FIG. 1, an exemplary embodiment of an apparatus 100 for determining action guides is illustrated. The apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or May include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, at least a processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 108 communicatively connected to at least a processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive a user action 112. With continued reference to FIG. 1, user action 112 includes a user action 112. For the purposes of this disclosure, a "user action" is a specific step or task that a user is confronting. For the purposes of this disclosure, a "user" is an individual, group, organization, or entity that uses apparatus 100. In an embodiment, user action 112 may include business actions. As a non-limiting example, user action 112 may include any investments for a project such as but not limited to research, design, development, testing, implementation, evaluation, marketing, or the like. As another non-limiting example, user action 112 may include stock investment, financial investment, or the like. For example, and without limitation, user action 112 may include 'whether to expand to increase market share.' 'whether to renovate a company's website,' or the like. In another embodiment, user action 112 may include personal actions. As another non-limiting example, user action 112 may include 'whether to commit a one-year gym membership,' 'whether to resign from a current job,' 'whether to transition to a different career path,' 'whether to pursue further education,' or the like. In some embodiments, user action 112 may include a plurality of user actions 112. As a non-limiting example, user action 112 may include a plurality of tasks that a user is deliberating upon and unable to finalize a decision on which to carry out. Persons skilled in the art, upon reviewing the entirety of this disclosure, may appreciate various user data that may be used for apparatus 100. In some embodiments, user action 112 may include an alternative user action. For the purposes of this disclosure, an "alternative user action" is the specific steps or tasks that a user is deliberating on and evaluating by comparing with a user action in order to make an informed decision. In some embodiments, alternative user action may be consistent with user action 112. In some embodiments, user action 112 may be stored in user database 116. In some embodiments, user action 112 may be retrieved from user database 116. User database 116 disclosed herein is further described below.

With continued reference to FIG. 1, user action 112 may include a user action expectation. For the purposes of this disclosure, a "user action expectation" is the desired outcome or achievement that user is intending to accomplish. In some embodiments, user action 112 may be carried out by user to achieve a user action expectation. As a non-limiting example, user action expectation may include numerical value or a string containing a plurality of words, wherein each word may be a data object. For example, and without limitation, user action expectation may include a precise financial target to attain by undertaking user action 112. For example, and without limitation, user action expectation may include a personal goal to attain by undertaking user action 112. Persons skilled in the art, upon reviewing the entirety of this disclosure, may appreciate various user action expectations that can be used for apparatus 100. In some embodiments, user action expectation may be stored in user database 116. In some embodiments, user action expectation may be retrieved from user database 116.

With continued reference to FIG. 1, in some embodiments, user action 112 may include a user task. For the purposes of this disclosure, a "user task" is a task or activity that has been done by a user to achieve a user action expectation before undertaking a user action. As a non-limiting example, if user action expectation of user action 112 includes a precise financial target, user task may include tasks or activities that has been done by user to achieve the financial target before undertaking the user action 112. As another non-limiting example, if user action expectation of user action 112 includes a specific personal goal, user task may include tasks or activities that has been done by user to achieve the personal goal before undertaking the user action 112.

With continued reference to FIG. 1, user action 112 includes a user usage 120. For the purposes of this disclosure, "user usage" is any type of investment that has been made. In an embodiment, user usage 120 may include a time usage. For the purposes of this disclosure, a "time usage" is amount of time used or spent by user, and which cannot be recovered or used for any other purpose. In some embodiments, time usage may be obtained by processor 104 from time tracking software. For the purposes of this disclosure, "time tracking software" is a type of computer program that allows user to track the time spent on various tasks and activities. In some embodiments, time tracking software may allow user to log their time manually or automatically track time based on their computer activity. In some embodiments, time tracking software may generate reports and analytics based on the time data collected. Examples of time tracking software include Toggl, Harvest, RescueTime, Clockify and CosmoLex. In some embodiments, time usage may be obtained from OCR, where the OCR may analyze a document that user submitted to find time usage. As a non-limiting example, the document may include any report that user submitted or created for tasks or activities. For example, and without limitation, the document may include a report that summarizes the progress, performance, or results of the project or tasks for a project. The OCR and the document disclosed herein are described further in detail below. In some embodiments, time usage may be received from user. In some embodiments, processor 104 may obtain time usage using cookies. For the purposes of this disclosure, "cookies" are small text files stored on a user's device that contain information about their browsing activities. As a non-limiting example, time usage can be obtained by leveraging cookies that track user interactions on a web page or application. For example, and without limitation, when user visits a website or uses an online service, cookies may capture and store data. In a non-limiting example, cookies may capture and store the timestamp of user's visit, the duration of user's session, the specific pages user accessed, or the like. This information may be used to calculate and estimate time usage of user on different activities or sections of a website.

With continued reference to FIG. 1, in some embodiments, user action 112 may include a resource usage. For the purposes of this disclosure, a "resource usage" is an amount and/or number of resources used or spent by user and which cannot be recovered. For the purposes of this disclosure, "resource" is any physical or virtual entity that can be used to perform a task or achieve a goal. As a non-limiting example, resource may include various types of assets or inputs such as, but not limited to, human resources, financial resources, physical resources, informational resources, and the like. For example, and without limitation, human resources may include a number of people who worked for user's project or the amount of labor hours, broken down by job title or department and by task. For example, and without limitation, financial resources may include money, capital, loans, investments, and operating expenses, broken down by task or department and other financial assets that user uses to finance the user's project. For example, and without limitation, physical resources may include land, buildings, equipment, materials, and other property that user uses to operate the user's project. In some embodiments, resource usage may be retrieved from documents using OCR or language processing module. In some embodiments, resource usage may be received from user.

With continued reference to FIG. 1, in some embodiments, processor 104 may further receive user information. In some embodiments, user action 112 may include user information. For the purposes of this disclosure, "user information" is information related to a user. As a non-limiting example, the user information of the user action 112 may include user's name, a number of individual of user (i.e. size), type of user action 112, and the like. For example, and without limitation, when user is one person, then a number of individuals of the user is one (1). For example, and without limitation, when user is a company, then a number of individuals of the user is the number of employees in the company. For example, and without limitation, type of user action 112 may include personal, business, or the like. For another example, and without limitation, type of user action 112 may include type of business, such as engineering, sales, food, pharmaceutical, or the like. Persons skilled in the art, upon reviewing the entirety of this disclosure, may appreciate various user information that may be used as the user action 112. In some embodiments, user action expectation may be stored in user database 116. In some embodiments, user action expectation may be retrieved from user database 116.

With continued reference to FIG. 1, in some embodiments, user action 112 may be retrieved from a user database 116. As a non-limiting example, processor 104 may retrieve user action expectation, user information, user action 112, user usage 120, time usage, resource usage, and the like of user action 112 from user database 116. In some embodiments, apparatus 100 may include user database 116. As used in this disclosure, "user database" is a data structure configured to store data associated with user and any information related to user. In one or more embodiments, user database 116 may include input or calculated information and datum related to user. As a non-limiting example, user database 116 may store user action 112, current usage 124, action template data 128, template action expectation 132, action feasibility 136, action guide 140, or the like. In some embodiments, a datum history may be stored in user database 116. As a non-limiting example, the datum history may include real-time and/or previous input data related to user or user's project. In one or more embodiments, user database 116 may include real-time or previously determined data related to user or user's project. As a non-limiting example, user database 116 may include instructions from user, who may be an expert user, a past user in embodiments disclosed herein, or the like, where the instructions may include examples of data related to user or user action 112.

With continued reference to FIG. 1, in some embodiments, processor 104 may be communicatively connected with user database 116. For example, and without limitation, in some cases, user database 116 may be local to processor 104. In another example, and without limitation, user database 116 may be remote to processor 104 and communicative with processor 104 by way of one or more networks.

The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store user database 116. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, user database 116 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, processor 104 may receive user action 112 from user device 144. As a non-limiting example, user may input user action 112 using user device 144. For example, and without limitation, user may manually input user information, user action 112, user action expectation, user usage 120, and the like using user device 144. User may have a capability to process, store or transmit any information independently using user device 144. For the purposes of this disclosure, a "user device" is any device a user uses to input data. In an embodiment, user device 144 may include a personal device. For the purposes of this disclosure, a "personal device" is any device personally owned by a user. As a non-limiting example, the personal device may include a laptop, tablet, mobile phone, smart watch, or things of the like. User device 144 may include an interface configured to receive inputs from user. In another embodiment, user device 144 may include a shared device. For the purposes of this disclosure, a "shared device" is a device that is designed for use by multiple users. In some embodiments, the shared device may be used by one or more users at different times. As a non-limiting example, the shared devices may include desktop computers, kiosks, screens, tablets, or the like.

With continued reference to FIG. 1, in some embodiments, user device 144 may include a display. For the purposes of this disclosure, a "display" is a device that presents visual information or data. As a non-limiting example, the display may present visual information or data in one or more forms of text, graphics, images, video, and the like. The display may be configured to provide a way for user to view and/or interact with information, including but not limited to user action 112, current usage 124, template action expectation 132, action feasibility 136, action guide 140, and/or the like. In some embodiments, the display may be implemented in any user device 144 disclosed in the entirety of this disclosure. In some embodiments, the display may include different technologies, such as liquid crystal display (LCD), a light-emitting diode (LED), organic light-emitting diode (OLED), plasma, projection, touch screen, and/or the like. In some embodiments, the display may include varying resolutions, sizes, and aspect ratios.

With continued reference to FIG. 1, in some embodiments, processor 104 may receive user action 112 from optical character recognition (OCR). In a non-limiting example, processor 104 may analyze a document to find user action 112 using OCR or language processing module. For example, and without limitation, processor 104 may find user action expectation, user usage 120, or the like. As used in this disclosure, a "document" is a material that serves as a record and provides official information. As a non-limiting example, document may include any documents user has used or created. For example, and without limitation, the document may include a report that summarizes a plan, timeline, research or budget for activities or tasks. For example, and without limitation, the document may include a report that summarizes the progress, performance, or results of activities or tasks. The document may include any document introduced in the entirety of this disclosure. For the purposes of this disclosure, an "optical character recognition" is a technology that enables the recognition and conversion of printed or written text into machine-encoded text. In some cases, processor 104 may be configured to recognize a keyword using the OCR to find user action 112. As used in this disclosure, a "keyword" is an element of word or syntax used to identify and/or match elements to each other. In some cases, processor 104 may transcribe much or even substantially all user action 112.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of user action 112. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the user action 112 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted features may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 2. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes documents. Since the adaptive classifier may have learned something useful a little too late to recognize characters on the first pass, a second pass may be run over documents. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, memory 108 contains instructions configuring processor 104 to convert user usage 120 into a current usage 124. For the purposes of this disclosure, a "current usage" is quantification of user usage in terms of its corresponding monetary value. In some embodiments, current usage 124 may include a numerical value. As a non-limiting example, a numerical value may indicate monetary value of user usage 120. In some cases, current usage 124 may include a sum of current usage 124 of a plurality of user usages 120 as described further in detail below. In some embodiments, current usage 124 may be stored in user database 116. In some cases, current usage 124 may be retrieved from user database 116.

With continued reference to FIG. 1, in some cases, processor 104 may convert user usage 120 into current usage 124 using a usage weight. For the purposes of this disclosure, a "usage weight" is a predetermined monetary value or cost of each user usage. In an embodiment, user weight may include actual expense incurred. In another embodiment, user weight may include estimated cost based on market rates or standards. In some embodiments, user weight may be stored in user database 116. In some embodiments, user weight may be retrieved from user database 116. In some embodiments, user may manually input user weight for user usage 120 using user device 144. In some embodiments, processor 104 may retrieve user weight using OCR or language processing module. As a non-limiting example, OCR may analyze document to find user weight for user usage 120. In some embodiments, processor 104 may retrieve user weight using a web crawler. As a non-limiting example, the web crawler may analyze any websites or social media to find user weight for user usage 120.

With continued reference to FIG. 1, in an embodiment, user weight may include a predetermined monetary value of time usage. As a non-limiting example, usage weight may include hourly rate for user's time. As another non-limiting example, user weight may include daily rate, yearly rate, or the like. For example, and without limitation, if user weight may include hourly rate of $30 for user's time, then current usage 124 for 5 hours of time usage may include $150. For another example, and without limitation, if user weight may include yearly rate of $130000 for user's time, then current usage 124 for 2 years and 6 months of time usage may include $325000.

With continued reference to FIG. 1, in another embodiment, user weight may include a predetermined monetary value of resource usage. As a non-limiting example, usage weight may include a cost of labor, equipment, materials, software, or the like. As another non-limiting example, user weight may include costs of any resources disclosed in the entirety of this disclosure. For example, and without limitation, if user has hired 10 employee for 5 months and their monthly salaries are $3500 (user weight), current usage 124 for resource usage may include $175000. For another example, and without limitation, if user has used 1000 units of electricity in a month and the cost per unit is $0.10 (user weight), current usage 124 of resource usage for electricity may include $100. For another example, and without limitation, if a manufacturing process (user) uses 1000 kilograms of raw material and the cost of the material is $2 per kilogram (user weight), current usage 124 of the resource usage for the raw material may include $2,000.

With continued reference to FIG. 1, in some embodiments, current usage 124 may include a sum of a plurality of current usages 124. As a non-limiting example, current usage 124 may include a sum of converted time usage (a first current usage 124) and converted resource usage (a second current usage 124). For example, and without limitation, if a first current usage 124 for time usage of $325,000, a second current usage 124 for resource usage of material (physical resources) of $2,000 and a third current usage 124 for resource usage of labor (human resources) of $175,000, current usage 124 of user usage 120 may include $502,000.

With continued reference to FIG. 1, memory 108 contains instructions configuring processor 104 to obtain action template data 128. For the purposes of this disclosure, "action template data" is reference data that can be compared with user action. In some embodiments, action template data 128 may include a template expectation. For the purposes of this disclosure, a "template expectation" is a standard desired outcome, achievement or goal that user might intend to accomplish. In some embodiments, template expectation may be consistent with user action expectation. In some embodiments, template expectation may include template task and/or template usage 130 related to the template expectation.

With continued reference to FIG. 1, in some embodiments, action template data 128 may include a template task. For the purposes of this disclosure, a "template task" is standard tasks or activities that were or have been done to achieve a template expectation. As a non-limiting example, template task may include a precise financial target and tasks or activities that are or should be done to attain the target. As another non-limiting example, template task may include a personal goal and tasks or activities that are or should be done to attain the goal. In some embodiments, template task may include a template positive expectation. For the purposes of this disclosure, a "template positive expectation" is a standard or reference potential benefit that can be obtained as a result of undertaking template task. In some embodiments, template positive expectation may be consistent with positive expectation as described below. As a non-limiting example, template positive expectation may include financial benefit. For example, and without limitation, financial benefit of template positive expectation may include higher revenue or sale, higher income, cost savings, or the like. As another non-limiting example, positive expectation may include intangible benefit. For example, and without limitation, intangible benefit of template positive expectation may include improved employee safety or morale, customer satisfaction, higher self-esteem, increased brand recognition, or the like. As another non-limiting example, template positive expectation may include competitive advantage, improved product quality, increased innovation, improved risk management, increased employee engagement and satisfaction, improved regulatory compliance, or the like. Persons skilled in the art, upon reviewing the entirety of this disclosure, may appreciate various template positive expectations that can be used for apparatus 100.

With continued reference to FIG. 1, in some embodiments, template task may include a template negative expectation. For the purposes of this disclosure, a "template negative expectation" is a standard or reference potential loss as a result of undertaking template task. In some embodiments, template negative expectation may be consistent with negative expectation as described below. As a non-limiting example, template negative expectation may include financial loss. For example, and without limitation, financial loss of template negative expectation may include direct loss. For example, and without limitation, direct loss may include human resource loss, physical resource loss, informational resource loss, financial resource loss, or the like. For example, and without limitation, financial loss of template negative expectation may include indirect loss. For example, and without limitation, indirect loss may include electricity cost, overhead costs from management, utilities, or the like. As another non-limiting example, template negative expectation may include intangible loss. For example, and without limitation, intangible loss of template negative expectation may include decrease in productivity level, reduced customer satisfaction, reduced employee morale, reduced self-esteem, reputational damage, negative repercussions on a community, or the like. As another non-limiting example, template negative expectation may include opportunity costs. As another non-limiting example, template negative expectation may include a potential risk. For example, and without limitation, potential risk may include regulatory risks, competition, environmental impacts, or the like. Persons skilled in the art, upon reviewing the entirety of this disclosure, may appreciate various template negative expectations that can be used for apparatus 100.

With continued reference to FIG. 1, action template data 128 includes a template usage 130. For the purposes of this disclosure, a "template usage" is a standard or reference investments that were or have been done to achieve template expectation. As a non-limiting example, template usage 130 may include a template time usage, template resource usage, or the like. For the purposes of this disclosure, an "template time usage" is standard amount of time that was or has been invested to achieve template expectation. As a non-limiting example, expected time usage may include numerical value of times. For example, and without limitation, expected usage may include numerical value of minutes, hours, days, months, years, seasons, or the like. For the purposes of this disclosure, an "template resource usage" is standard amount of resource that was or has been invested to achieve template expectation. As a non-limiting example, template resource usage may include human resources, physical resources, financial resources, informational resources, and the like.

With continued reference to FIG. 1, in some embodiments, action template data 128 may include action feasibility 136 that is higher or equal to feasibility threshold. Action feasibility 136 and feasibility threshold are disclosed further in detail below. As a non-limiting example, action template data 128 may not include action template data 128 that includes action feasibility 136 that is lower than feasibility threshold. For example, and without limitation, action template data 128 may include a benchmark that is a predetermined standard. In some embodiments, action template data 128 may include market trends. For the purposes of this disclosure, "market trend" is the general direction of the overall performance of a particular market or industry over a period of time. In some cases, action template data 128 may include a competitor's user action 112. As a non-limiting example, the competitor's user action 112 may include action feasibility 136 higher or equal to feasibility threshold, in other words, that was successful. For the purposes of this disclosure, a "competitor" is any individual, group or entity that is in a similar field as user. In some embodiments, action template data 128 may be stored in user database 116. In some embodiments, action template data 128 may be retrieved from user database 116. This may allow for restoration of past versions of action template data 128 (historical data). As a non-limiting example, action template data 128 may include past versions of action template data 128 that was matched for user action 112 that includes action feasibility 136 above feasibility threshold. In some embodiments, action template data 128 may be obtained from user. As a non-limiting example, the user may include an expert user, previous user, or the like.

With continued reference to FIG. 1, in some embodiments, action template data 128 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to scrape action template data 128 from competitor's websites, social media sites, blogs, or forums, news site, or the like. The web crawler may be seeded and/or trained with a reputable website to begin the search. In some embodiments, a web crawler may be generated by processor 104. In some embodiments, the web crawler may be trained with information received from user, such as but not limited to an expert user, through a user interface. In some embodiments, the web crawler may be configured to generate a web query. A web query May include search criteria received from a user. For example, a user may submit a plurality of websites for the web crawler to search action template data 128 from. Additionally, the web crawler function may be configured to search for and/or detect one or more data patterns. A "data pattern" as used in this disclosure is any repeating forms of information. A data pattern may include repeating tasks or activities. As a non-limiting example, data pattern may include repeating template time usage, template resource usage, or the like. As another non-limiting example, data pattern may include market trends. In some embodiments, the web crawler may be configured to determine the relevancy of a data pattern. Relevancy may be determined by a relevancy score. A relevancy score may be automatically generated by processor 104, received from a machine learning model, and/or received from the user. In some embodiments, a relevancy score may include a range of numerical values that may correspond to a relevancy strength of data received from a web crawler function. As a non-limiting example, a web crawler function may search the Internet for action template data 128 related to user or user action 112. The web crawler may return action template data 128, such as, as non-limiting examples, template expectation, template task, template usage 130, template positive expectation, template negative expectation, and the like.

With continued reference to FIG. 1, memory 108 contains instructions configuring processor 104 to generate a template action expectation 132. For the purposes of this disclosure, "template action expectation" is projected result or outcome associated with user action, where the projected result is generated by assuming user action has undertaken by user. In some embodiments, template action expectation 132 may include an expected task. For the purposes of this disclosure, an "expected task" is anticipated tasks or activities that may be needed to achieve a user action expectation after undertaking a user action. As a non-limiting example, if user action expectation of user action 112 includes a precise financial target, then expected task may include tasks or activities that may be needed to achieve the financial target after undertaking the user action 112. As another non-limiting example, if user action expectation of user action 112 includes a specific personal goal, then expected task may include tasks or activities that may be needed to achieve the personal goal after undertaking the user action 112.

With continued reference to FIG. 1, in some embodiments, template action expectation 132 may include an expected usage. For the purposes of this disclosure, a "expected usage" is anticipated investments that can be done to achieve a user action expectation after undertaking a user action. As a non-limiting example, expected usage may include an expected time usage, expected resource usage, or the like. For the purposes of this disclosure, an "expected time usage" is anticipated amount of time that can be used to achieve user action expectation after undertaking user action 112. As a non-limiting example, expected time usage may include numerical value of times. For example, and without limitation, expected usage may include numerical value of minutes, hours, days, months, years, seasons, or the like. For the purposes of this disclosure, an "expected resource usage" is anticipated amount of resource that can be used to achieve user action expectation after undertaking user action 112. As a non-limiting example, expected resource usage may include human resources, physical resources, financial resources, informational resources, and the like. In some embodiments, template action expectation 132 may be stored in user database 116. In some embodiments, template action expectation 132 may be retrieved from user database 116.

With continued reference to FIG. 1, in some embodiments, processor 104 may generate template action expectation 132 as a function of user action expectation of user action 112, and template expectation of action template data 128. As a non-limiting example, processor 104 may identify a keyword of user action expectation and template expectation using OCR or language processing module, then compare the keywords of the user action expectation and the template expectation to generate template action expectation 132. If the keywords of the user action expectation and the template expectation matches, in a non-limiting example, template action expectation 132 of user action 112 may include action template data 128 that is related to the template expectation. For example, and without limitation, processor 104 may use OCR to identify a keyword of user action expectation that includes 'increase revenue' and a keyword of template expectation that includes 'increase revenue,' then, as the keywords matches, the processor 104 may generate template action expectation 132, where expected task of the template action expectation 132 may include template task and/or expected usage of the template action expectation 132 may include template usage 130 that are related to the template expectation.

With continued reference to FIG. 1, in some embodiments, template action expectation 132 may include inputs from user. As a non-limiting example, user may manually input expected task and/or expected usage. In some embodiments, processor 104 may generate template action expectation 132 using a template action expectation machine learning model 144. For the purposes of this disclosure, a "template action expectation machine learning model" is a machine learning model that generates template action expectation. In some embodiments, template action expectation machine learning model 144 may be consistent with a machine learning model described with respect to FIG. 2. In some embodiments, template action expectation machine learning model 144 may be trained with template action expectation training data. For the purposes of this disclosure, "template action expectation training data" is training data that is used to train a template action expectation machine learning model. The template action expectation training data disclosed herein may be consistent with training data described with respect to FIG. 2. In some embodiments, template action expectation training data may correlate action template data 128 to template action expectation 132 of user action 112. As a non-limiting example, template action expectation training data may correlate template task and/or template usage 130 of template expectation that matches with user action expectation of user action to template action expectation 132 of the user action. For example, and without limitation, template action expectation training data may correlate template task and/or template usage 130 of template expectation that includes 'increase revenue' keyword to template action expectation of user action 112, where the user action may include user action expectation that includes 'increase revenue' keyword. In some embodiments, the template action expectation training data may be received from one or more users, user database 116, external computing devices, and/or previous iterations of processing. As a non-limiting example, the template action expectation training data may include instructions from a user, who may be an expert user, a past user in embodiments disclosed herein, or the like, which may be stored in memory and/or stored in user database 116, where the instructions may include labeling of training examples.

With continued reference to FIG. 1, in some embodiments, processor 104 may generate template action expectation 132 using a template action expectation lookup table. A "lookup table," for the purposes of this disclosure, is an array of data that maps input values to output values. The lookup table may be used to replace a runtime computation with an array indexing operation. As a non-limiting example, an input value of template action expectation lookup table may include a plurality of user action expectation and/or keywords of user action expectation. As a non-limiting example, an output value of the template action expectation lookup table may include a plurality of template action expectation, such as but not limited to expected task and/or expected usage. In some embodiments, processor 104 may be configured to "lookup" a given user action expectation and/or keyword of user action expectation to find a corresponding template action expectation 132 using template action expectation lookup table. As a non-limiting example, computing device 104 may be configured to "lookup" a given user action expectation and/or keyword of user action expectation 'increase revenue' in order to find a corresponding template action expectation 132 of user action 112 such as expected task and/or expected usage. In an embodiment, the lookup table may include interpolation. For the purposes of this disclosure, an "interpolation" refers to a process for estimating values that lie between known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, in some embodiments, processor 104 may use a language processor module to find a keyword. The language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by processor 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating the language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or Processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in an embodiment, template action expectation 132 may include a positive expectation. For the purposes of this disclosure, a "positive expectation" is any potential benefit that can be obtained by undertaking user action. As a non-limiting example, positive expectation may include financial benefit. For example, and without limitation, financial benefit of positive expectation may include higher revenue or sale, higher income, cost savings, or the like. As another non-limiting example, positive expectation may include intangible benefit. For example, and without limitation, intangible benefit of positive expectation may include improved employee safety or morale, customer satisfaction, higher self-esteem, increased brand recognition, or the like. As another non-limiting example, positive expectation may include competitive advantage, improved product quality, increased innovation, improved risk management, increased employee engagement and satisfaction, improved regulatory compliance, or the like. In some embodiments, positive expectation may include a specific numerical value of the positive expectation. As a non-limiting example, positive expectation may include specific amount of money that can be saved, increased, or the like. As another non-limiting example, positive expectation may include specific number of rate of improvement, increase, or the like. Persons skilled in the art, upon reviewing the entirety of this disclosure, may appreciate various positive expectations that can be used for apparatus 100.

With continued reference to FIG. 1, in some embodiments, positive expectation may include a positive expectation weight. For the purposes of this disclosure, a "positive expectation weight" is a predetermined numerical value that represents the estimated value or importance of a positive expectation. In some embodiments, a higher positive expectation weight may indicate a greater potential for positive impact. In some embodiments, each positive expectation may include different values of positive expectation weight. As a non-limiting example, financial benefit of positive expectation may include higher positive expectation weights than intangible benefit of positive expectation. As another non-limiting example, higher customer satisfaction of intangible benefit may include higher positive expectation weights than improved employee morale of intangible benefit. As another non-limiting example, cost saving of $500000 may include higher positive expectation weights than cost saving of $1000. In some cases, positive expectation weight may include a positive expectation weight range. For the purposes of this disclosure, a "positive expectation weight range" is a range of numbers for determining proper positive expectation weight for positive expectation. As a non-limiting example, positive expectation weight range may include a range of numbers, such as without limitation 0-1, 0-3, 4-10, 11-20, 21-50, 51-100, 10-50, 1000-2000, and the like, where each of positive expectation weight may include positive expectation weight range. As a non-limiting example, when the positive expectation weight is 5, the positive expectation weight range is $1000-$2000 for cost saving and positive expectation is cost saving of $1500, the positive expectation may include positive expectation weight of 5. In some embodiments, positive expectation weight may be stored in user database 116. In some embodiments, positive expectation weight may be retrieved in user database 116. In some embodiments, user may manually input positive expectation weight.

With continued reference to FIG. 1, in some embodiments, template action expectation 132 may include a negative expectation. For the purposes of this disclosure, a "negative expectation" is any potential cost or loss that can be resulted by undertaking user action. As a non-limiting example, negative expectation may include financial loss. For example, and without limitation, financial loss of negative expectation may include direct loss. For example, and without limitation, direct loss may include human resource loss, physical resource loss, informational resource loss, financial resource loss, or the like. For example, and without limitation, financial loss of negative expectation may include indirect loss. For example, and without limitation, indirect loss may include electricity cost, overhead costs from management, utilities, or the like. As another non-limiting example, negative expectation may include intangible loss. For example, and without limitation, intangible loss of negative expectation may include decrease in productivity level, reduced customer satisfaction, reduced employee morale, reduced self-esteem, reputational damage, negative repercussions on a community, or the like. As another non-limiting example, negative expectation may include opportunity costs. For the purposes of this disclosure, "opportunity cost" is lost benefits or opportunities that arise when user pursues user action over alternative user action. As another non-limiting example, negative expectation may include a potential risk. For example, and without limitation, potential risk may include regulatory risks, competition, environmental impacts, or the like. In some embodiments, negative expectation may include a specific numerical value of the negative expectation. As a non-limiting example, negative expectation may include specific amount of money that can be reduced, lost, or the like. As another non-limiting example, negative expectation may include specific number of rate of dissatisfaction, reduction, loss, or the like. Persons skilled in the art, upon reviewing the entirety of this disclosure, may appreciate various negative expectations that can be used for apparatus 100.

With continued reference to FIG. 1, in some embodiments, negative expectation may include negative expectation weight. For the purposes of this disclosure, "negative expectation weight" is a predetermined numerical value that represents the potential amount of loss or cost associated with taking a user action. In some embodiments, a higher negative expectation weight may indicate a greater potential for negative impact. In some embodiments, each negative expectation may include different values of negative expectation weight. As a non-limiting example, financial loss of negative expectation may include higher negative expectation weight than intangible loss of negative expectation. As another non-limiting example, direct loss of financial loss may include higher negative expectation weight than indirect loss of financial loss. As another non-limiting example, human resource loss of direct loss may include higher negative expectation weight than physical resource loss of direct loss. As another non-limiting example, financial loss may include higher negative expectation weight than opportunity cost. As another non-limiting example, financial resource loss of $500000 may include higher negative expectation weight values than financial resource loss of $1000. In some cases, negative expectation weight may include a negative expectation weight range. For the purposes of this disclosure, a "negative expectation weight range" is a range of numbers for determining proper negative expectation weight for negative expectation. As a non-limiting example, negative expectation weight range may include a range of numbers, such as without limitation 0-1, 0-3, 4-10, 11-20, 21-50, 51-100, 10-50, 1000-2000, and the like, where each of negative expectation weight may include negative expectation weight range. As a non-limiting example, when the negative expectation weight is 5, the negative expectation weight range is $1000-$2000 for financial loss and financial loss of $1500, the negative expectation may include negative expectation weight of 5. In some embodiments, negative expectation weight may be stored in user database 116. In some embodiments, negative expectation weight may be retrieved in user database 116. In some embodiments, user may manually input negative expectation weight.

With continued reference to FIG. 1, in some embodiments, processor 104 may generate positive expectation and/or negative expectation as a function of action template data 128. As a non-limiting example, positive expectation of user action 112 may include template positive expectation of template task. In a non-limiting example, processor 104 may compare user action 112 and template task to see if they match. For example, and without limitation, processor 104 may compare the user action 112 and the template task using OCR or language processing module by comparing a keyword of the user action 112 and the template task. Then, in a non-limiting example, if the user action 112 and the template task matches, positive expectation of the user action 112 may include template positive expectation of the template task.

With continued reference to FIG. 1, as another non-limiting example, negative expectation of user action 112 may include template negative expectation of template task. In a non-limiting example, processor 104 may compare user action 112 and template task to see if they match. Then, in a non-limiting example, if the user action 112 and the template task matches, negative expectation of the user action 112 may include template negative expectation of the template task. As another non-limiting example, negative expectation of user action 112 may include expected usage of the user action 112. In some embodiments, processor 104 may convert expected usage in terms of its corresponding monetary value. In some embodiments, processor 104 may convert expected usage using usage weight. The usage weight disclosed herein is further described above. In some cases, the converted expected usage may include a sum of usage weights of a plurality of expected usages. As a non-limiting example, if expected usage includes expected time usage of 2 years and 6 months that includes user weight of $130000 yearly rate and expected resource usage of 1000 kilograms of raw material that includes user weight of $2 per kilogram and 1000 units of electricity that includes user weight of $0.10 cost per unit, then processor 104 may convert the expected usage to $327100.

With continued reference to FIG. 1, in some embodiments, user may manually input positive expectation and/or negative expectation and processor 104 may generate positive expectation and/or negative expectation using the user's input. In some embodiments, processor 104 may generate template action expectation 132 using a positive expectation machine learning model. For the purposes of this disclosure, a "positive expectation learning model" is a machine learning model that generates positive expectation. In some embodiments, positive expectation machine learning model may be consistent with a machine learning model described with respect to FIG. 2. In some embodiments, positive expectation machine learning model may be trained with positive expectation training data. For the purposes of this disclosure, "positive expectation training data" is training data that is used to train a positive expectation machine learning model. The positive expectation training data disclosed herein may be consistent with training data described with respect to FIG. 2. In some embodiments, the positive expectation training data may be received from one or more users, user database 116, external computing devices, and/or previous iterations of processing. As a non-limiting example, the positive expectation training data may include instructions from a user, who may be an expert user, a past user in embodiments disclosed herein, or the like, which may be stored in memory and/or stored in user database 116, where the instructions may include labeling of training examples.

With continued reference to FIG. 1, in some embodiments, processor 104 may generate positive expectation of template action expectation 132 as a function of expected task and/or expected usage using positive expectation machine learning model. In some embodiments, positive expectation training data may correlate template positive expectation of template task to positive expectation of template action expectation 132 of user action 112. As a non-limiting example, positive expectation training data may correlate template positive expectation of template task, where the template task matches with user action 112, to positive expectation of template action expectation 132.

With continued reference to FIG. 1, in some embodiments, processor 104 may generate template action expectation 132 using a negative expectation machine learning model. For the purposes of this disclosure, a "negative expectation learning model" is a machine learning model that generates negative expectation. In some embodiments, negative expectation machine learning model may be consistent with a machine learning model described with respect to FIG. 2. In some embodiments, negative expectation machine learning model may be trained with negative expectation training data. For the purposes of this disclosure, "negative expectation training data" is training data that is used to train a negative expectation machine learning model. The negative expectation training data disclosed herein may be consistent with training data described with respect to FIG. 2. In some embodiments, negative expectation training data may be received from one or more users, user database 116, external computing devices, and/or previous iterations of processing. As a non-limiting example, negative expectation training data may include instructions from a user, who may be an expert user, a past user in embodiments disclosed herein, or the like, which may be stored in memory and/or stored in user database 116, where the instructions may include labeling of training examples.

With continued reference to FIG. 1, in some embodiments, processor 104 may generate negative expectation of template action expectation 132 as a function of expected task and/or expected usage using negative expectation machine learning model. In some embodiments, negative expectation training data may correlate expected usage of template action expectation 132 to negative expectation of the template action expectation 132. In some embodiments, negative expectation training data may correlate template negative expectation of template task to negative expectation of template action expectation 132 of user action 112. As a non-limiting example, negative expectation training data may correlate template negative expectation of template task, where the template task matches with user action 112, to negative expectation of template action expectation 132.

With continued reference to FIG. 1, processor 104 may be configured to generate template action expectation 132 using a decision tree. As a non-limiting example, processor 104 may generate expected task, expected usage, positive expectation, negative expectation, or the like using decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to user action 112 or action template data 128. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Processor 104 may generate two or more decision trees, which may overlap; for instance, a root node of one tree may connect to and/or receive output from one or more terminal nodes of another tree, intermediate nodes of one tree may be shared with another tree, or the like.

With continued reference to FIG. 1, processor 104 may build decision tree by following relational identification; for example, relational indication may specify that a first rule module receives an input from at least a second rule module and generates an output to at least a third rule module, and so forth, which may indicate to processor 104 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, processor 104 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

With continued reference to FIG. 1, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

With continued reference to FIG. 1, processor 104 may generate template action expectation 132 using linear regression techniques. As a non-limiting example, processor 104 may generate expected task, expected usage, positive expectation, negative expectation, or the like using linear regression techniques. Processor 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, memory 108 contains instructions configuring processor 104 to determine an action feasibility 136. For the purposes of this disclosure, an "action feasibility" is a numerical value representing an evaluation of feasibility to undertake user action. For the purposes of this disclosure, "feasibility" refers to a practicality for user to undertake user action. In some embodiments, action feasibility 136 may further include possibility of user action 112 to achieve user action expectation. In some embodiments, action feasibility 136 may be stored in user database 116. In some embodiments, action feasibility 136 may be retrieved from user database 116. In one or more non-limiting embodiments, action feasibility 136 may include a quantitative characteristic. As a non-limiting example, action feasibility 136 may include a numerical value within a set range. For example, and without limitation, action feasibility 136 may be "2" for a set range of 0-10, where "0" represents there is no feasibility for user to undertake user action and "10" represents the highest feasibility for user to undertake user action. For example, and without limitation, "0" may represent possibility of user action 112 to achieve user action expectation is low or none and "10" represents the highest possibility of user action to achieve user action expectation. For example, and without limitation, action feasibility 136 may be "30" for a set range of 0-100, where "0" represents there is no feasibility for user to undertake user action and "100" represents the highest feasibility for user to undertake user action. For example, and without limitation, "0" may represent possibility of user action 112 to achieve user action expectation is low or none and "100" represents the highest possibility of user action to achieve user action expectation. In other non-limiting embodiments, action feasibility 136 may include a quality characteristic, such as a color coding, where each color is associated with a level of action feasibility 136. As a non-limiting example, action feasibility 136 may include red, where red may represent the lowest and/or no feasibility or possibility. As another non-limiting example, action feasibility 136 may include green, where green may represent high feasibility or possibility. As another non-limiting example, action feasibility 136 may include light grey for the lowest and/or no feasibility or possibility and the color may get darker as the action feasibility 136 increases. In some embodiments, action feasibility 136 may include low to high scoring. As a non-limiting example, action feasibility 136 may include 'low' when there is the lowest and/or no feasibility or possibility for user action 112 to success and action feasibility 136 may include 'high' when there is high feasibility or possibility for user action 112 to success.

With continued reference to FIG. 1, processor 104 is configured to determine action feasibility 136 as a function of current usage 124 and template action expectation 132. In some embodiments, processor 104 may compare a sum of current usage 124 and negative expectation of template action expectation 132 with positive expectation of the template action expectation 132 to determine action feasibility 136. As a non-limiting example, processor 104 may calculate a sum of current usage 124 and negative expectation weights of a plurality of negative expectations and a sum of positive expectation weights of a plurality of positive expectations. Then, in a non-limiting example, the processor 104 may compare the sum of the current usage 124 and the negative expectation weights with the sum of the positive expectation weights. For example, and without limitation, if the sum of the current usage 124 and the negative expectations weights are bigger than the sum of the positive expectation weights, action feasibility 136 may include 'low' level or any value that indicates low feasibility or possibility. For example, and without limitation, if the sum of the current usage 124 and the negative expectations weights are smaller than the sum of the positive expectation weights, action feasibility 136 may include 'high' level or any value that indicates high feasibility or possibility. In these examples, feasibility threshold may include a sum of positive expectation weights of a plurality of positive expectations, where the feasibility threshold is described in detail below.

With continued reference to FIG. 1, in another non-limiting example, processor 104 may determine action feasibility 136 by subtracting a sum of current usage 124 and negative expectation weights of a plurality of negative expectations from a sum of positive expectation weights of a plurality of positive expectations. In an embodiment, if subtraction of a sum of current usage 124 and negative expectations weights from a sum of positive expectation weights includes negative value, action feasibility 136 may include 'low' level or any value that indicates low feasibility or possibility. As a non-limiting example, if a sum of current usage 124 and negative expectations weights includes $50000 and a sum of positive expectation weights includes $65000, action feasibility 136 may include 'low' level or any value that indicates low feasibility or possibility since subtraction includes positive value of $15000. In another embodiment, if subtraction of a sum of current usage 124 and negative expectations weights from a sum of positive expectation weights includes positive value, action feasibility 136 may include 'high' level or any value that indicates high feasibility or possibility. As a non-limiting example, if a sum of current usage 124 and negative expectations weights includes $90000 and a sum of positive expectation weights includes $60000, action feasibility 136 may include 'high' level or any value that indicates high feasibility or possibility since subtraction includes negative value, -$30000.

With continued reference to FIG. 1, in some embodiments, processor 104 may be configured to determine action feasibility 136 using a feasibility threshold. For the purposes of this disclosure, a "feasibility threshold" is a numerical value for determining an action feasibility. In some embodiments, feasibility threshold may include any numerical values. In some embodiments, feasibility threshold may include a range of numerical values. As a non-limiting example, feasibility threshold may include (−2500)-(−100), 0-10, 50-100, 1000-2200, or the like. In some embodiments, feasibility threshold may be obtained from user. As a non-limiting example, user may manually input feasibility threshold. In some embodiments, feasibility threshold may include previously used feasibility threshold in previous iterations of processing. In some embodiments, feasibility threshold may be stored in user database 116. In some embodiments, feasibility threshold may be retrieved from user database 116.

With continued reference to FIG. 1, in an embodiment, feasibility threshold may include any numerical value for positive expectation. As a non-limiting example, a sum positive expectation weights of a plurality of positive expectations that is greater or equal to feasibility threshold may include 'high' action feasibility 136 or any value that indicates high feasibility or possibility. As another non-limiting example, a sum positive expectation weights of a plurality of positive expectations that is less than feasibility threshold may include 'low' action feasibility 136 or any value that indicates low feasibility or possibility. For example, and without limitation, when feasibility threshold includes $30000 for positive expectation and positive expectation includes $70000, action feasibility 136 may include 'high' or any value that indicates high feasibility or possibility.

With continued reference to FIG. 1, in another embodiment, feasibility threshold may include any numerical value for negative expectation. As a non-limiting example, a sum negative expectation weights of a plurality of negative expectations that is greater or equal to feasibility threshold may include 'low' action feasibility 136 or any value that indicates low feasibility or possibility. As another non-limiting example, a sum negative expectation weights of a plurality of negative expectations that is less than feasibility threshold may include 'high' action feasibility 136 or any value that indicates high feasibility or possibility. For example, and without limitation, when feasibility threshold includes $30000 for negative expectation and negative expectation includes $70000, action feasibility 136 may include 'low' or any value that indicates low feasibility or possibility.

With continued reference to FIG. 1, in another embodiment, feasibility threshold may include any numerical value for current usage 124. As a non-limiting example, current usage 124 that is greater or equal to feasibility threshold may include 'low' action feasibility 136 or any value that indicates low feasibility or possibility. As another non-limiting example, current usage 124 that is less than feasibility threshold may include 'high' action feasibility 136 or any value that indicates high feasibility or possibility. For example, and without limitation, when feasibility threshold includes $30000 for current usage 124 and current usage 124 includes $70000, action feasibility 136 may include 'low' or any value that indicates low feasibility or possibility.

With continued reference to FIG. 1, in another embodiment, feasibility threshold may include any numerical value or a range of numerical values for subtraction of a sum of current usage 124 and negative expectations weights from a sum of positive expectation weights. In some embodiments, feasibility threshold may include a range of numerical values for each of action feasibility 136. As a non-limiting example, 'low' action feasibility 136 may include feasibility threshold of 1000 to −100000 or less and 'high' action feasibility 136 may include feasibility threshold of 1001 to 100000 or greater. For example, and without limitation, if subtraction of a sum of current usage 124 and negative expectations weights from a sum of positive expectation weights includes 3000, action feasibility 136 may include 'low.' As another non-limiting example, '0' action feasibility 136 in a set range of 0-10 may include feasibility threshold of −10000 or less, '1' action feasibility 136 in the set range may include feasibility threshold of −5000 to −9999, '2' action feasibility 136 in the set range may include feasibility threshold of −1000 to −4999, '3' action feasibility 136 in the set range may include feasibility threshold of 1000 to −999, '4' action feasibility 136 in the set range may include feasibility threshold of 2500 to 1001, '5' action feasibility 136 in the set range may include feasibility threshold of 7000 to 2501, '10' action feasibility 136 in the set range may include feasibility threshold of 100000 or greater, or the like. For example, and without limitation, if subtraction of a sum of current usage 124 and negative expectations weights from a sum of positive expectation weights includes 3000, action feasibility 136 may include '4.' For example, and without limitation, if subtraction of a sum of current usage 124 and negative expectations weights from a sum of positive expectation weights includes −25000, action feasibility 136 may include '0.' The example above is merely an example and persons skilled in the art, upon reviewing the entirety of this disclosure, may appreciate various feasibility thresholds that can be used for the subtraction.

With continued reference to FIG. 1, in some embodiments, processor 104 may determine action feasibility 136 using a feasibility machine learning model 148. For the purposes of this disclosure, a "feasibility machine learning model" is a machine learning model that determines action feasibility. In some embodiments, feasibility machine learning model 148 may be consistent with a machine learning model described with respect to FIG. 2. In some embodiments, feasibility machine learning model 148 may be trained with feasibility training data. For the purposes of this disclosure, "feasibility training data" is training data that is used to train a feasibility machine learning model. The feasibility training data disclosed herein may be consistent with training data described with respect to FIG. 2. In some embodiments, feasibility machine learning model may be used by processor 104 to determine action feasibility 136 by analyzing large amounts of data from feasibility training data and using that data to identify patterns and make predictions about action feasibility 136. As a non-limiting example, feasibility machine learning model 148 may use algorithms and statistical techniques as described in the entirety of this disclosure. In some embodiments, feasibility training data may correlate user action 112 and/or current usage 124 and action template data 128 to action feasibility 136. As a non-limiting example, feasibility machine learning model 148 may be trained on feasibility training data that is related to user information, user action expectation, user task, user usage, current usage, template expectation, template task and/or template usage 130. Then, in a non-limiting example, processor 104 may use feasibility machine learning model 148 to predict action feasibility 136, taking into account factors in feasibility training data. In some embodiments, feasibility training data may be received from one or more users, user database 116, external computing devices, and/or previous iterations of processing. As a non-limiting example, feasibility training data may include instructions from a user, who may be an expert user, a past user in embodiments disclosed herein, or the like, which may be stored in memory and/or stored in user database 116, where the instructions may include labeling of training examples. In some embodiments, feasibility machine learning model 148 may be trained to learn from past examples and may adjust its predictions over time as new data becomes available.

With continued reference to FIG. 1, processor 104 may generate template action expectation 132 and/or determine action feasibility 136 using a Monte Carlo simulation. As a non-limiting example, processor 104 may generate expected task, expected usage, positive expectation, negative expectation, or the like using Monte Carlo simulation. "Monte Carlo simulation" may refer to a "Monte Carlo method," "Monte Carlo experiment," and/or executing a "Monte Carlo algorithm." A Monte Carlo simulation may be a mathematical technique that may generate variables, numerical values, and the like, for modeling risk, uncertainty, etc. of a certain system using a stochastic simulation process. Monte Carlo simulations may encompass a range of algorithms and mathematical analysis techniques such as Markov Model Monte Carlo (MMMC) simulations, Mckean-Vlasov processes, Monte Carlo localization, among other probabilistic heuristics. As used herein, a Monte Carlo simulation may generate random action feasibility 136, wherein each template action expectation 132 may represent a sufficiently good solution to an optimization problem, wherein the solution is action feasibility 136 represented by a numerical value, 2D polar coordinate, vector, matrix, or the like, that represents action feasibility 136. Each generated action feasibility 136 may be associated with action template data 128, current usage 124 and/or user action 112. And thus, each action feasibility 136 may have values of action feasibility 136 to perform a randomly generate action feasibility 136. Each action feasibility 136 may then have associated with it a "value of action feasibility" variable, wherein the value of action feasibility 136 is a numerical value that represents the action feasibility 136 for user action 112. Action feasibility 136 can be plotted and/or mapped as a function of their value of action feasibility 136 and a machine-learning process may select action feasibility 136 based on some criterion, for instance the action feasibility 136 with the most minimized value of action feasibility 136 and select those action feasibility 136 as inputs to subsequent calculations.

A Monte Carlo simulation may be a class of computation algorithms used by a machine-learning process that may rely on repeated stochastic sampling to obtain numerical results, for instance generating random spatial locations within a confined space on a map, wherein each spatial location can have a numerical parameter describing it. Monte Carlo simulations may be performed with dynamic systems that may be coupled with an analysis method, for instance an unknown action feasibility 136 relative to user action 112, current usage 124, action template data 128 and/or feasibility threshold, wherein the user action 112, current usage 124, action template data 128 and/or feasibility threshold is determine by sampling within the simulation. In non-limiting illustrative examples, a machine-learning process, such as but not limited to a supervised machine-learning process, may accept generated candidate solutions from a Monte Carlo simulation, as described above, and calculate refined action feasibility 136 to the candidate action feasibility 136, wherein the predicted paths may contain numerical results from the simulated action feasibility 136. The Monte Carlo simulation may generate many candidate template action feasibility 136, where a machine-learning process/model may narrow the number of action feasibility 136 based on user action 112, current usage 124, action template data 128 and/or feasibility threshold from a plurality of action feasibilities 136. Such a machine-learning process may iteratively generate selected action feasibility 136 based on a criterion, for instance and without limitation user action 112, current usage 124, action template data 128 and/or feasibility threshold, wherein when it is time for action feasibility 136 to be used for purposes of generating action guide 140, a machine-learning process may retrieve action feasibility 136.

With continued reference to FIG. 1, in a non-limiting example of generating template action expectation 132 using Monte Carlo simulator, user action 112 may include launching a new product and template action expectation 132 may include expected usage, expected selling price, the estimated demand, the production costs, and the marketing expenses. Monte Carlo simulator may run a plurality of simulations, with each simulation using a different set of random inputs based on the estimated probability distributions of each variable. For example, and without limitation, the resulted simulation may include a 70% chance that the product will generate a profit of at least $100,000 (positive expectation) but may also include a 20% chance that the product will result in a loss of $50,000 (negative expectation) or more.

With continued reference to FIG. 1, in some embodiments, processor 104 may include a machine learning model to improve accuracy of determining optimal decision making parameters. In some embodiments, the machine learning model may be consistent with any machine learning model described in the entirety of this disclosure. In some embodiments, the machine learning model may determine initial set of parameters, where the set of parameter may be initially determined. In some embodiments, the initial set of parameters may be modified using random noise, where the random noise may be added to the parameters to simulate real-world variability. In some embodiments, a range of parameter values may be selected to ensure a broad exploration of the parameter space. In some embodiments, machine learning model may be rerun with the modified parameters to generate a new set of outcomes. In some embodiments, the machine learning model may compare the model result against second set of training data to determine parameter for better accuracy for decision making of apparatus 100. The noise that is introduced may be obtained by modeling a time series of data and finding the expected noise from that data. In some embodiments, machine learning may enhance the function of computers and technological processes by automating the detection of anomalies or deviations from expected behavior. This may enable early identification of critical events, improved system performance, reduced downtime, enhanced security, more efficient resource allocation, or the like. In some embodiments, the machine learning model may be implemented in Monte Carlo simulator.

With continued reference to FIG. 1, memory 108 contains instructions configuring processor 104 to generate an action guide 140. For the purposes of this disclosure, an "action guide" is a suggestion for user to help resolve user action. In some embodiments, user may manually input action guide 140. As a non-limiting example, user may include an expert user or past user. In some embodiments, action guide 140 may include past user action 112 from previous iterations of processing. As a non-limiting example, action guide 140 may include past user action 112 that includes 'high' action feasibility 136 or any value that indicates high feasibility or possibility. As another non-limiting example, action guide 140 may include past user action 112 that achieved user action expectation. In some embodiments, action guide 140 may be stored in user database 116. In some embodiments, action guide 140 may be retrieved from user database 116.

With continued reference to FIG. 1, processor 104 generates action guide 140 as a function of action feasibility 136. In an embodiment, action guide 140 may include an action abandonment. For the purposes of this disclosure, an "action abandonment" is leaving a task or activity unfinished or incomplete. As a non-limiting example, action abandonment may include suggesting user to not undertake user action. As another non-limiting example, action abandonment may include suggesting user to stop pursuing user action expectation. In another embodiment, action guide 140 may include an action redirection. For the purposes of this disclosure, an "action redirection" is modifying user action in order to achieve a desired outcome. In an embodiment, action redirection may include modifying user action 112 to get higher action feasibility 136 that is higher than previous action feasibility 136 and feasibility threshold. In some embodiments, action redirection may include modifying user action 112 to get a specific value of action feasibility 136. As a non-limiting example, action redirection may include modifying user's behavior that is related to user usage or user task. For example, and without limitation, action redirection may include action template data 128, such as but not limited to template task or template usage 130, for user to use as a reference to modify user's behavior for user usage or user task. In some embodiments, action redirection may include switching user action 112 to another user action 112. As a non-limiting example, action redirection may include changing user action 112 to alternative user action. In some embodiments, processor 104 may determine action redirection for user action 112 that results in the highest action feasibility 136 for user action 112 once the user action 112 takes modification according to the action redirection. As a non-limiting example, processor 104 may calculate action feasibility 136 that might be resulted by modifying user action 112 according to potential action redirection of a plurality of action redirections, then determine one action redirection that gives the highest action feasibility 136 for the user action 112. In some embodiments, action guide 140 may include an action approval. For the purposes of this disclosure, an "action approval" is giving the green light or authorization for user action to be taken.

With continued reference to FIG. 1, in some embodiments, processor 104 may generate user guide 140 using a guide threshold. For the purposes of this disclosure, a "guide threshold" is a numerical value for determining an action guide. In some embodiments, guide threshold may include any numerical values. As a non-limiting example, guide threshold may include any numerical values of action feasibility 136. In some embodiments, guide threshold may include a range of numerical values. As a non-limiting example, guide threshold may include 0-3, 4-7, 8-10, 0-35, 36-65, 66-100, or the like. In some embodiments, guide threshold may include any quality characteristic of action feasibility 136 in color coding, grey scale, low to high scoring, or the like. In some embodiments, guide threshold may be obtained from user. As a non-limiting example, user may manually input guide threshold. In some embodiments, guide threshold may include previously used guide threshold in previous iterations of processing. In some embodiments, guide threshold may be stored in user database 116. In some embodiments, guide threshold may be retrieved from user database 116.

With continued reference to FIG. 1, in an embodiment, processor 104 may generate action abandonment as a function of action feasibility 136 and guide threshold. As a non-limiting example, when action feasibility 136 is lower than a value of guide threshold for action abandonment or within a range of values of guide threshold for action abandonment, processor 104 may generate action abandonment for user action 112. For example, and without limitation, when action feasibility 136 is 30 and guide threshold for action abandonment includes 40, then processor 104 may generate action abandonment for user action 112. For example, and without limitation, when action feasibility 136 is 30 and guide threshold for action abandonment includes 0-35, then processor 104 may generate action abandonment for user action 112.

With continued reference to FIG. 1, in another embodiment, processor 104 may generate action redirection as a function of action feasibility 136 and guide threshold. As a non-limiting example, when action feasibility 136 is lower than a value of guide threshold for action redirection and greater a value of guide threshold for action abandonment, processor 104 may generate action redirection for user action 112. For example, and without limitation, when action feasibility 136 is 45 and guide threshold for action abandonment includes 40 and guide threshold for action redirection includes 60, then processor 104 may generate action redirection for user action 112. As another non-limiting example, when action feasibility 136 is within a range of values of guide threshold for action redirection, processor 104 may generate action redirection for user action 112. For example, and without limitation, when action feasibility 136 is 45 and guide threshold for action redirection includes 36-55, then processor 104 may generate action redirection for user action 112.

With continued reference to FIG. 1, in another embodiment, processor 104 may generate action approval as a function of action feasibility 136 and guide threshold. As a non-limiting example, when action feasibility 136 is lower than a value of guide threshold for action approval and greater a value of guide threshold for action redirection, processor 104 may generate action approval for user action 112. For example, and without limitation, when action feasibility 136 is 88 and guide threshold for action redirection includes 60 and guide threshold for action approval includes 100, then processor 104 may generate action approval for user action 112. As another non-limiting example, when action feasibility 136 is within a range of values of guide threshold for action approval, processor 104 may generate action approval for user action 112. For example, and without limitation, when action feasibility 136 is 88 and guide threshold for action approval includes 70-100, then processor 104 may generate action approval for user action 112.

With continued reference to FIG. 1, in some embodiments, processor 104 may generate user guide 140 using a guide machine learning model 152. For the purposes of this disclosure, a "guide machine learning model" is a machine learning model that determines action guide. In some embodiments, guide machine learning model 152 may be consistent with a machine learning model described with respect to FIG. 2. In some embodiments, guide machine learning model 152 may be trained with guide training data. For the purposes of this disclosure, "guide training data" is training data that is used to train a guide machine learning model. The guide training data disclosed herein may be consistent with training data described with respect to FIG. 2. In some embodiments, guide machine learning model 152 may be used by processor 104 to generate action guide 140 by analyzing large amounts of data from guide training data and using that data to identify patterns and make decisions about action guide 140. As a non-limiting example, guide machine learning model 152 may use algorithms and statistical techniques as described in the entirety of this disclosure. In some embodiments, guide training data may correlate user actions, action feasibility and/or action template data to action guides. As a non-limiting example, guide machine learning model 152 may be trained on guide training data that is related to user action 112, action feasibility 136, guide threshold, user task, user usage, current usage, template expectation, template task and/or template usage 130. Then, in a non-limiting example, processor 104 may use guide machine learning model 152 to predict action guide 140, taking into account factors in guide training data. In some embodiments, guide training data may be received from one or more users, user database 116, external computing devices, and/or previous iterations of processing. As a non-limiting example, guide training data may include instructions from a user, who may be an expert user, a past user in embodiments disclosed herein, or the like, which may be stored in memory and/or stored in user database 116, where the instructions may include labeling of training examples. In some embodiments, guide machine learning model 152 may be trained to learn from past examples and may adjust its predictions over time as new data becomes available.

With continued reference to FIG. 1, in some embodiments, processor 104 may generate user guide 140 using a guide lookup table. In some embodiments, guide lookup table may be consistent with any lookup table disclosed in the entirety of this disclosure. In some embodiments, guide lookup table may 'lookup' given action feasibility 136 to find a corresponding action guide 140 for user action 112. As a non-limiting example, guide lookup table may correlate action feasibility 136 of 0 to action abandonment of action guide 140. As another non-limiting example, guide lookup table may correlate action feasibility 136 of 50 to action redirection of action guide 140. In some embodiments, guide lookup table may 'lookup' given user action 112 and template action expectation 132 to find a corresponding action guide 140 for user action 112. As a non-limiting example, guide lookup table may correlate a specific value of negative expectation to action abandonment of action guide 140. As another non-limiting example, guide lookup table may correlate a specific value of positive expectation to action approval of action guide 140. As another non-limiting example, guide lookup table may correlate a specific value of current usage 124 to action abandonment.

Figure 6:
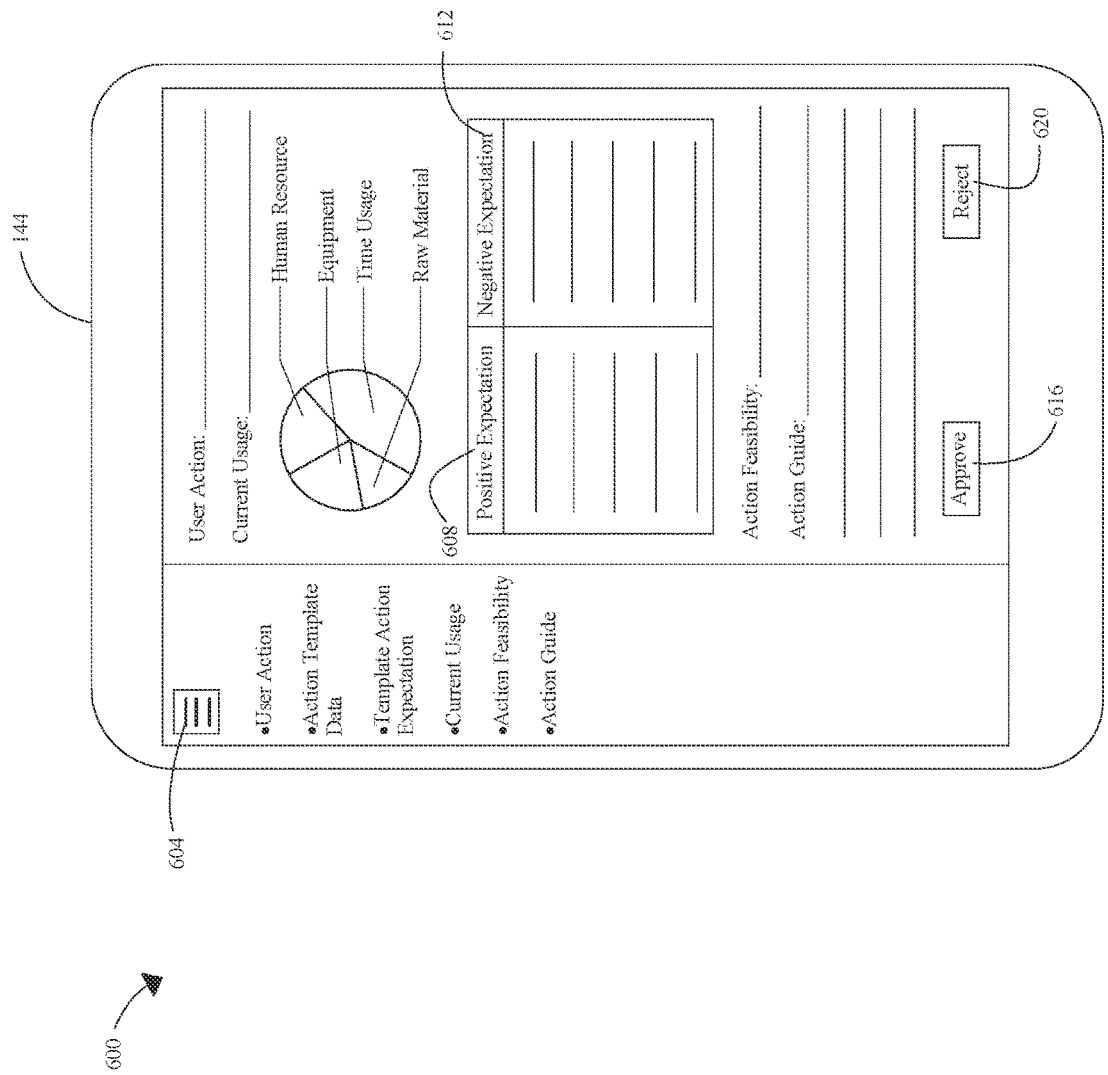
FIG. 6 is an illustration of an exemplary graphical user interface of a user device.

With continued reference to FIG. 1, memory 108 may include instructions configuring processor 104 to transmit data to user device 144. As a non-limiting example, processor 104 may transmit user action 112, current usage 124, action template data 128, template action expectation 132, action feasibility 136, action guide 140, and/or the like. In some embodiments, user device 144 may display the transmitted data to user. In some embodiments, processor 104 may generate user interface displaying the transmitted data. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with user. For example, user may interact with user interface in virtual reality. In some embodiments, user may interact with the use interface using a computing device distinct from and communicatively connected to at least a processor 104. For example, a smart phone, tablet, or laptop operated by user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. The GUI disclosed herein is illustrated in FIG. 6.

With continued reference to FIG. 1, in some embodiments, processor 104 may receive a user response from a user device 144. For the purposes of this disclosure, a "user response" is user's input related to user guide. In some embodiments, user response may include a rejection. For the purposes of this disclosure, a "rejection" is the act of refusing to accept an action guide. As a non-limiting example, when processor 104 receives rejection for a first action redirection, then the processor 104 may generate a second action redirection and transmit the second action redirection to user device 144 to display to user. As another non-limiting example, when processor 104 receives rejection for action abandonment, then the processor 104 may generate action redirection for user action 112 and transmit the action redirection to user device 144 to display to user.

Figure 2:
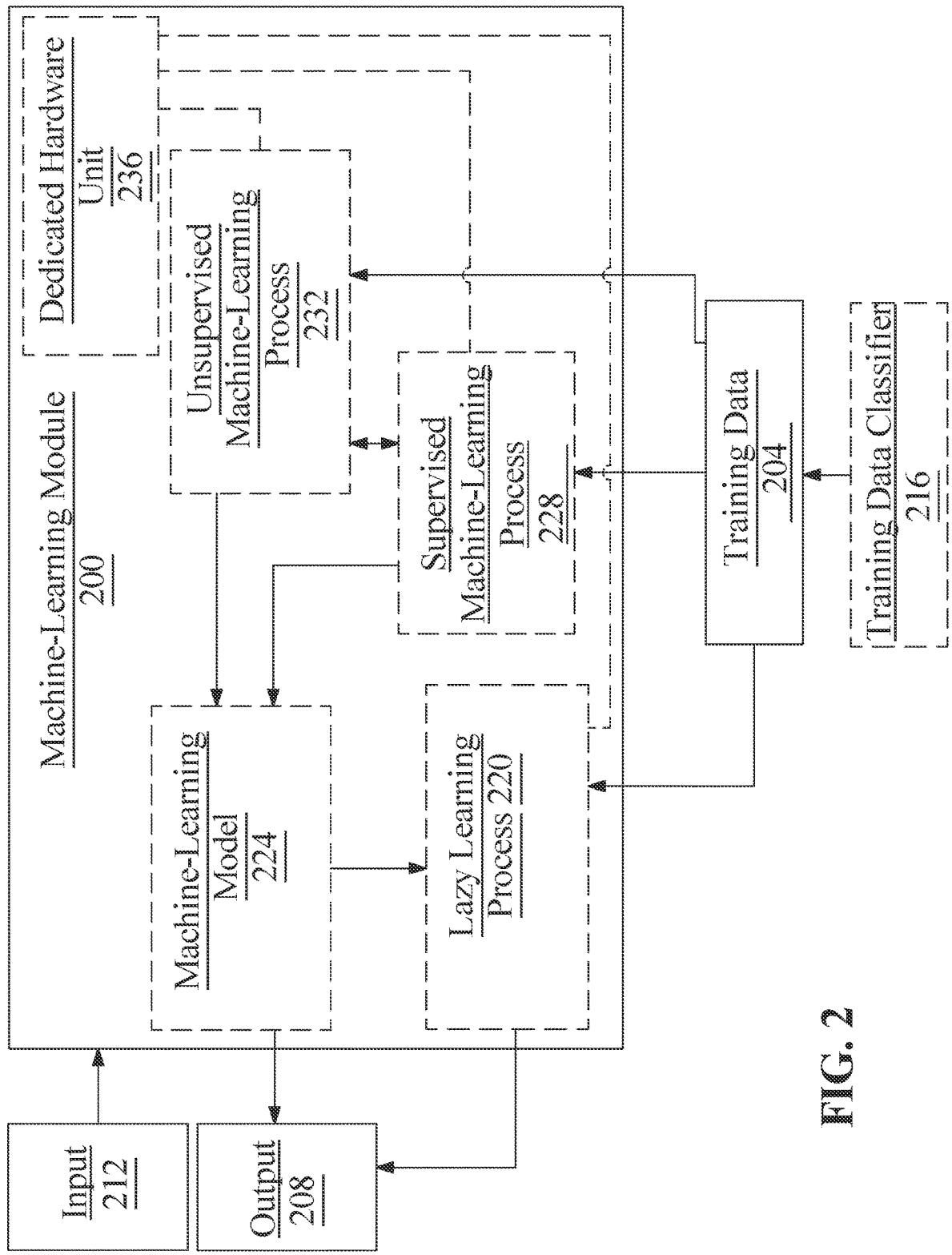
FIG. 2 illustrates a block diagram of exemplary embodiment of a machine learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, input data may include user action, current usage, action template data, template action expectation, action feasibility, and the like. As a non-limiting illustrative example, output data may include template action expectation, action feasibility, action guide, or the like.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data as a function of user information of user of user action 112. As a non-limiting example, training data classifier 216 may classify elements of training data as a function of a number of individual user (i.e. size). For example, and without limitation, when user is one person, then a number of individuals of the user is one (1). For example, and without limitation, when user is a company, then a number of individuals of the user is the number of employees in the company. In a non-limiting example, As a non-limiting example, training data classifier 216 may classify elements of training data as a function of type of user action 112, and the like. For example, and without limitation, type of user action 112 may include personal, business, or the like. For another example, and without limitation, type of user action 112 may include type of business, such as engineering, sales, food, pharmaceutical, or the like. By classifying elements of training data as a function of user information of user of user action 112, machine learning training algorithm and machine learning model may generate action feasibility as a function of user information of user action 112.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user action, current usage, action template data, template action expectation, action feasibility, and the like as described above as inputs, template action expectation, action feasibility, action guide, or the like outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples.

Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
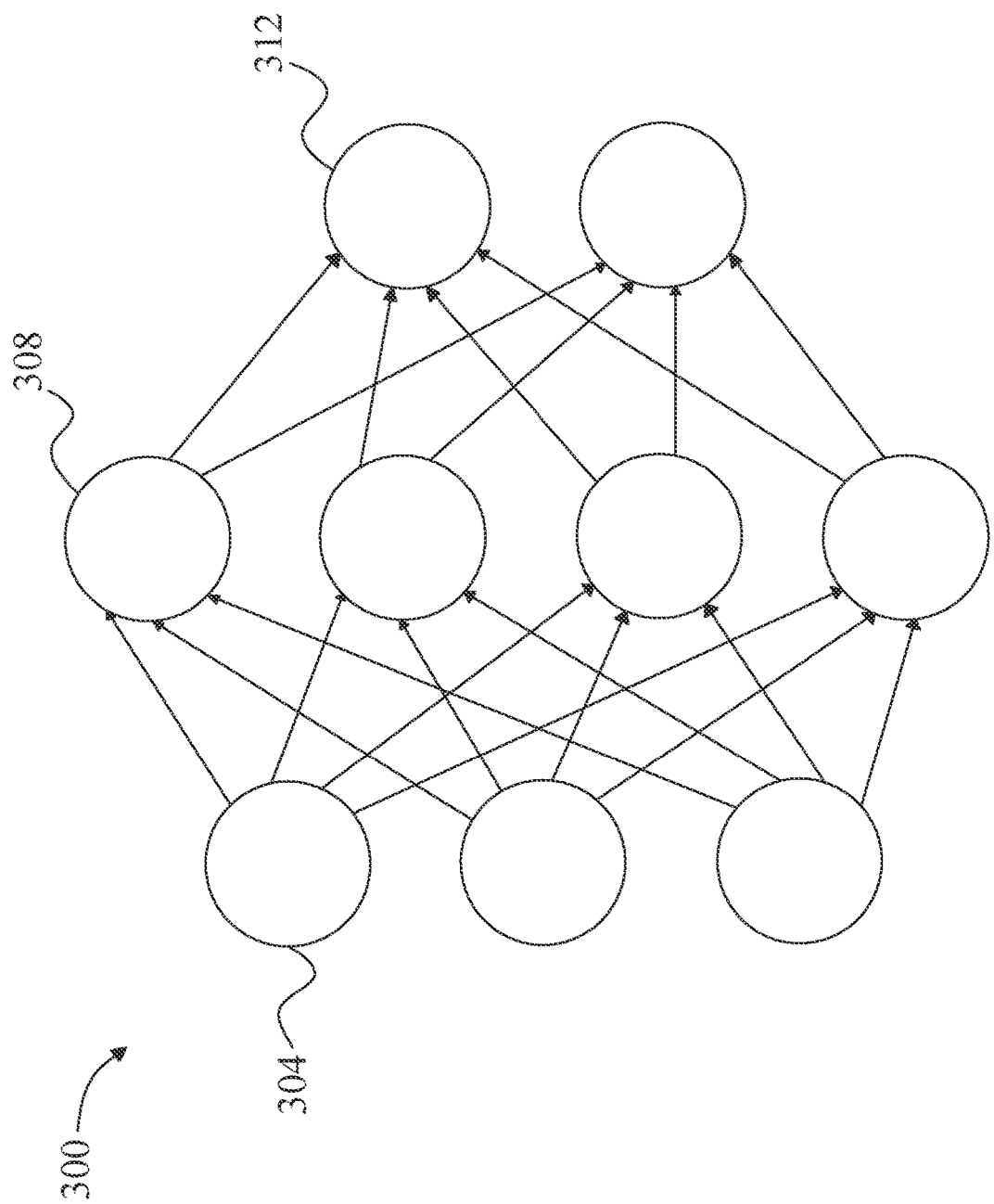
FIG. 3 illustrates a diagram of an exemplary nodal network.

Referring now to FIG. 3, an exemplary embodiment of neural network 300 is illustrated. A neural network 300, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
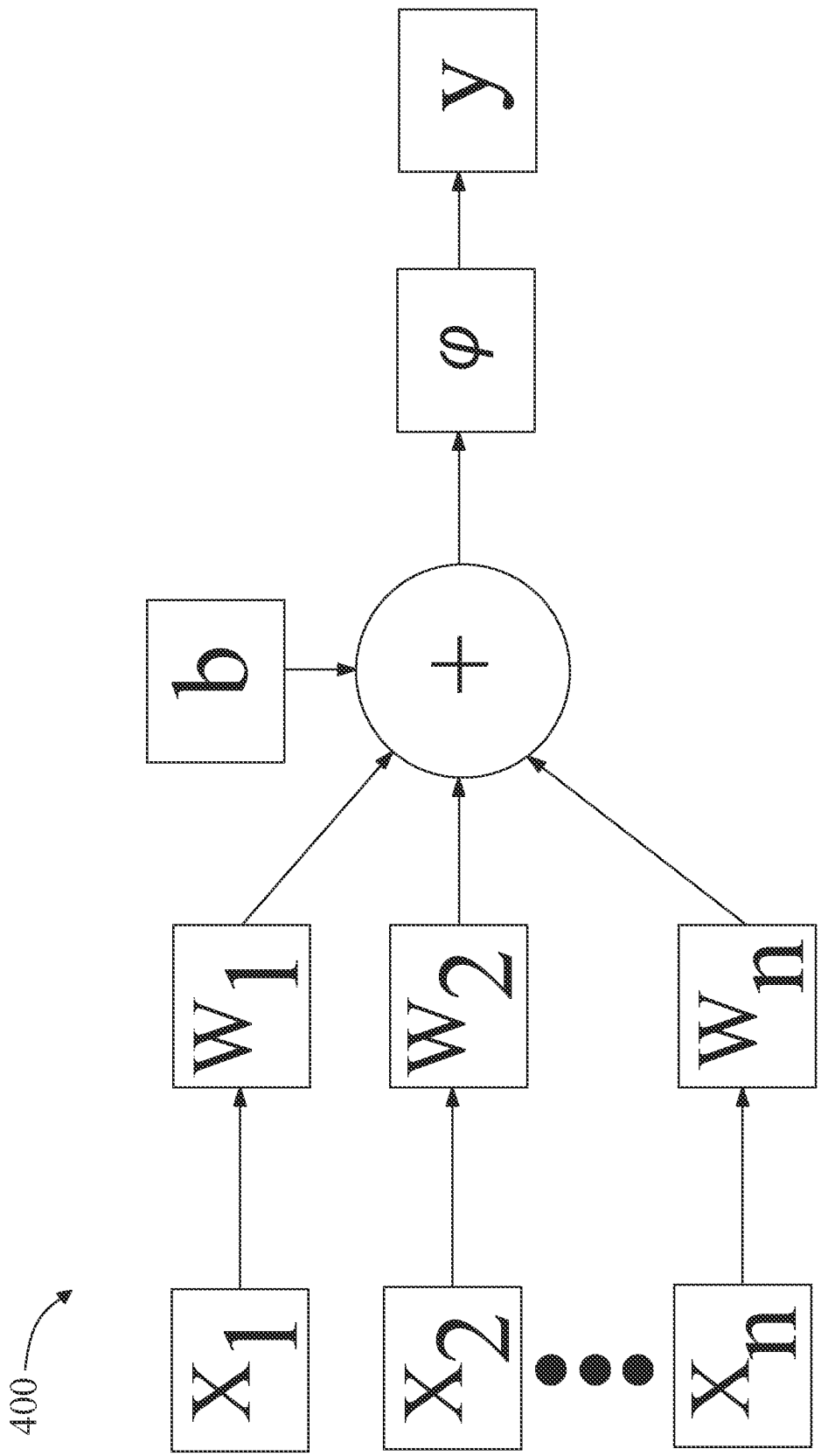
FIG. 4 illustrates a block diagram of an exemplary node.

Referring now to FIG. 4, an exemplary embodiment of a node of a neural network is illustrated. A node may include, without limitation, a plurality of inputs x, that may receive numerical values from inputs to a neural network containing the node and/or from other nodes. Node may perform a weighted sum of inputs using weights w', that are multiplied by respective inputs x1. Additionally or alternatively, a bias b may be added to the weighted sum of the inputs such that an offset is added to each unit in the neural network layer that is independent of the input to the layer. The weighted sum may be input into a function φ, which may generate one or more outputs y. Weight w', applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Figure 5:
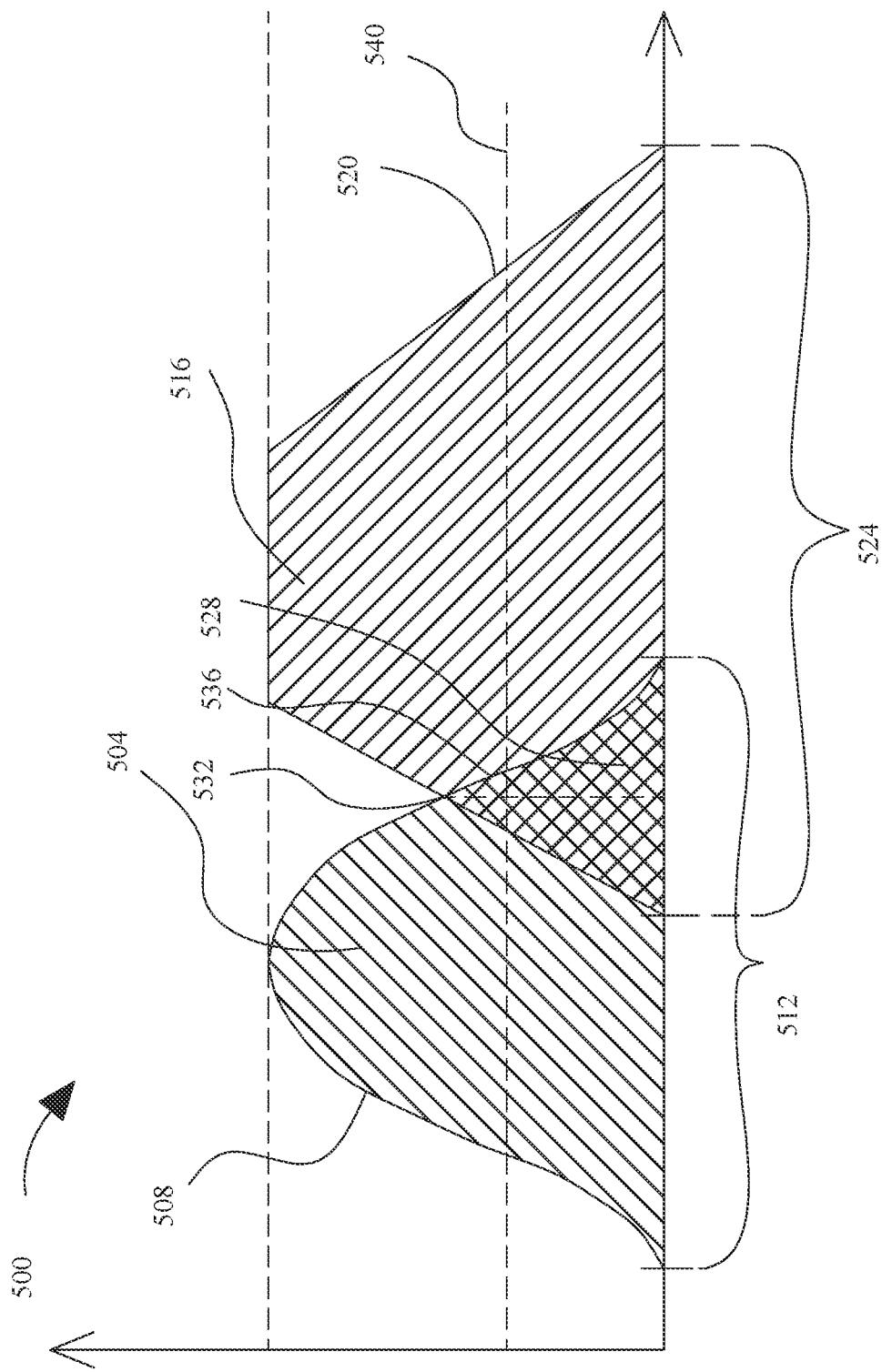
FIG. 5 illustrates a block diagram of a fuzzy set system.

Referring now to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 5, first fuzzy set 504 may represent any value or combination of values as described above, including output from one or more machine-learning models. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or an assessed groups, alone or in combination. Alternatively or additionally, each threshold may be tuned by a machine-learning and/or statistical process, for instance and without limitation as described in further detail below.

With continued reference to FIG. 5, in an embodiment, user action and/or action template data may be compared to multiple template action expectations fuzzy sets. For instance, action template data may be represented by a fuzzy set that is compared to each of the multiple template action expectation fuzzy sets; and a degree of overlap exceeding a threshold between the user action and/or action template data fuzzy set and any of the multiple template action expectations fuzzy sets may cause processor to rank template action expectations as a function of the user action and/or action template data. For instance, in one embodiment there may be two template action expectation fuzzy sets, representing respectively a first template action expectation and a second template action expectation. First template action expectation may have a first fuzzy set; and second template action expectation may have a second fuzzy set. Processor 104, for example, may compare a user action and/or action template data fuzzy set with each of the first and second template action expectation fuzzy sets, as described above, and classify a user profile to either, both, or neither of the first and second template action expectations. Machine-learning methods as described throughout may, in a non-limiting example, generate coefficients used in fuzzy set equations as described above, such as without limitation x, c, and σ of a Gaussian set as described above, as outputs of machine-learning methods. Likewise, user action and/or action template data may be used indirectly to determine a fuzzy set, as user action and/or action template data fuzzy set may be derived from outputs of one or more machine-learning models that take the user action and/or action template data such as products and/or data directly or indirectly as inputs.

With continued reference to FIG. 5, a computing device may use a logic comparison program, such as, but not limited to, a fuzzy logic model to determine a correlation between a plurality of user action and/or action template data and a plurality of template action expectations. A correlation between user action and/or action template data and template action expectations may include, but is not limited to, irrelevant, poor, average, high, and the like; each such designation may be represented as a value for a linguistic variable representing correlation, or in other words, a fuzzy set as described above that corresponds to a degree of positive correlations as calculated using any statistical, machine-learning, or other method that may occur to a person skilled in the art upon reviewing the entirety of this disclosure. In other words, a given element of user action and/or action template data object may have a first non-zero value for membership in a first linguistic variable value such as a high correlation and a second non-zero value for membership in a second linguistic variable value such as average correlation. In some embodiments, determining a correlation may include using a linear regression model. A linear regression model may include a machine learning model. A linear regression model may be trained using a machine learning process. A linear regression model may map statistics such as, but not limited to, degree of similarity with respect to the type of user action and/or action template data and template action expectations. In some embodiments, determining a correlation between user action and/or action template data and template action expectations may include using a classification model. The classification model may be configured to input collected data and cluster data to a centroid based on, but not limited to, frequency of appearance, linguistic indicators of correlation, and the like. Centroids may include scores assigned to them such that level of correlation of user action and/or action template data and template action expectations may each be assigned a score. In some embodiments, the classification model may include a K-means clustering model. In some embodiments, the classification model may include a particle swarm optimization model. In some embodiments, determining the classification model may include using a fuzzy inference engine. A fuzzy inference engine may be configured to map one or more elements of user action and/or action template data and template action expectation data using fuzzy logic. In some embodiments, user action and/or action template data and template action expectations may be arranged by a logic comparison program into various levels of correlation arrangements. A "correlation arrangement" as used in this disclosure is any grouping of objects and/or data based on degree of match based on template action expectation assessment. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure. Additionally and/or alternatively, the fuzzy set may be incorporated with user action and/or action template data.

Referring now to FIG. 6, an exemplary embodiment of graphical user interface (GUI) 600 of user device 144 is illustrated. In FIG. 6, illustrated GUI 600 is merely an example and persons skilled in the art, upon reviewing the entirety of this disclosure, may appreciate various ways to display data using GUI 600. GUI 600 and user device 144 disclosed herein are described in detail with respect to FIG. 1. In some embodiments, user device 144 may include a smartphone, tablet, laptop, desktop, smartwatch, or the like. In some embodiments, processor 104 may transmit data to user device 144. In some embodiments, processor 104 may generate GUI 600 to display the transmitted data. As a non-limiting example, data may include user action 112, current usage 124, action template data 128, template action expectation 132, action feasibility 136, action guide 140, and/or the like. As another non-limiting example, data may include alternative user action, user information, user action expectation, user task, user usage, such as but not limited to time usage, resource usage, or the like, template expectation, template task, template usage, expected task, expected usage, positive expectation 608, negative expectation 612, or the like. The positive expectation 608 and negative expectation 612 are further described with respect to FIG. 1. In some embodiments, GUI 600 may display information using text, image, graph, video, table, list, or the like. As a non-limiting example, GUI 600 may display user action 112 using text. As another non-limiting example, GUI 600 may display current usage 124 using text and/or graph. For example, and without limitation, GUI 600 may display a graph of current usage 124 that illustrates different percentage of various user usage 120 that includes the current usage 124. As another non-limiting example, GUI 600 may display a table of positive expectation and negative expectation of template action expectation 132. As another non-limiting example, GUI 600 may display a list of action guide 140.

With continued reference to FIG. 6, in some embodiments, user may interact with GUI 600 using user device 144. As a non-limiting example, user may touch a touch screen of user device 144, click, type, drag, or the like to interact with GUI 600. In some embodiments, GUI 600 may include a menu button 604. As a non-limiting example, user may click menu button 604 to see options in a menu bar. For example, and without limitation, menu bar may include various options user can click to check data related to the options. In a non-limiting example, user may click 'user action' in menu bar to check user action 112. In another non-limiting example, user may click 'current usage' to check current usage 124. In some embodiments, GUI 600 may include an approval button 608. For the purposes of this disclosure, an "approval button" is a button a user manipulates to approve an action guide. As a non-limiting example, processor 104 may receive user response when user click approval button 616. In some embodiments, user response may include approval. For the purposes of this disclosure, an "approval" is the act of accepting an action guide. In some embodiments, GUI 600 may include a rejection button 620. For the purposes of this disclosure, a "rejection button" is a button a user manipulates to reject an action guide. As a non-limiting example, user may use rejection button 620 to transmit rejection of user response. For example, and without limitation, as user transmits rejection for a first action guide 140 using rejection button 620, processor 104 may generate a second action guide 140, transmit the second action guide 140, then display the second action guide 140 using GUI 600.

Figure 7:
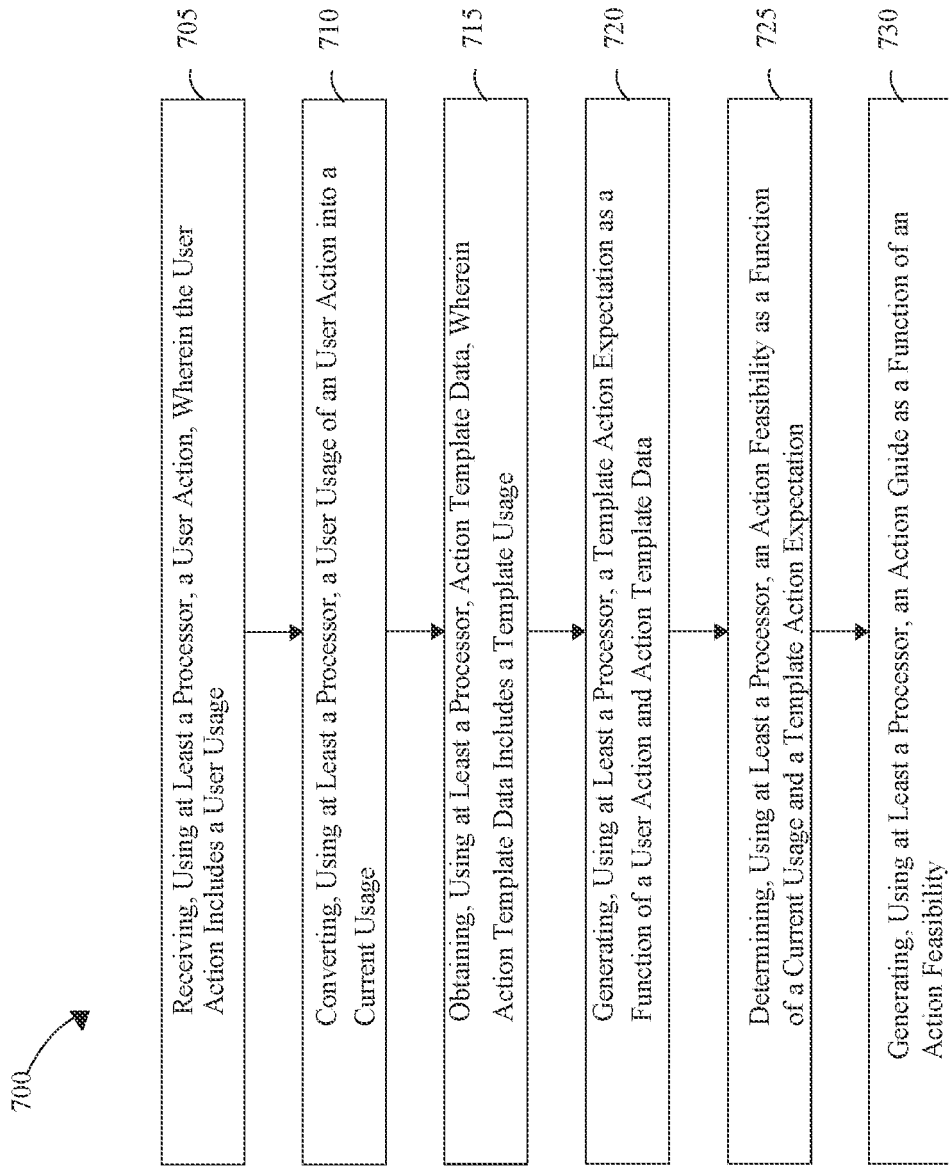
FIG. 7 illustrates a flow diagram of an exemplary method for determining action guides.

Referring now to FIG. 7, a flow diagram of an exemplary method 700 for determining action guides is illustrated. Method 700 includes a step 705 of receiving, using at least a processor, a user action, wherein the user action includes a user usage. In some embodiments, the user usage may include a time usage. These may be implemented as disclosed with respect to FIGS. 1-6.

With continued reference to FIG. 7, method 700 includes a step 710 of converting, using at least a processor, a user usage of a user action into a current usage. In some embodiments, method 700 may further include obtaining, using the at least a processor, usage weights of a first current usage and a second current usage and calculating, using the at least a processor, the current usage, wherein the current usage may include a sum of a first current usage and a second current usage that are converted respectively from the first user usage and the second user usage using the usage weights. These may be implemented as disclosed with respect to FIGS. 1-6.

With continued reference to FIG. 7, method 700 includes a step 715 of obtaining, using at least a processor, action template data, wherein the action template data includes a template usage. This may be implemented as disclosed with respect to FIGS. 1-6.

With continued reference to FIG. 7, method 700 includes a step 720 of generating, using at least a processor, a template action expectation as a function of a user action and action template data. In some embodiments, method 700 may further include generating, using the at least a processor, the template action expectation as a function of a user action expectation of the user action and the action template data. In some embodiments, the template action expectation may include a positive expectation, wherein the positive expectation may include a positive expectation weight. In some embodiments, the template action expectation may include a negative expectation, wherein the negative expectation may include a negative expectation weight. These may be implemented as disclosed with respect to FIGS. 1-6.

With continued reference to FIG. 7, method 700 includes a step 725 of determining, using at least a processor, an action feasibility as a function of a current usage and a template action expectation. In some embodiments, method 700 may further include determining, using the at least a processor, the action feasibility using a feasibility threshold, wherein the feasibility threshold is compared with the negative expectation to determine the action feasibility. These may be implemented as disclosed with respect to FIGS. 1-6.

With continued reference to FIG. 7, method 700 includes a step 730 of generating, using at least a processor, an action guide as a function of an action feasibility. In some embodiments, method 700 may further include generating, using the at least a processor, an action abandonment of the action guide when the action feasibility is below a guide threshold. In some embodiments, method 700 may further include generating, using the at least a processor, an action redirection of the action guide when the action feasibility is above the guide threshold. In some embodiments, method 700 may further include receiving, using the at least a processor, a rejection of a first action guide from a user and generating, using the at least a processor, a second action guide as a function of the rejection. These may be implemented as disclosed with respect to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
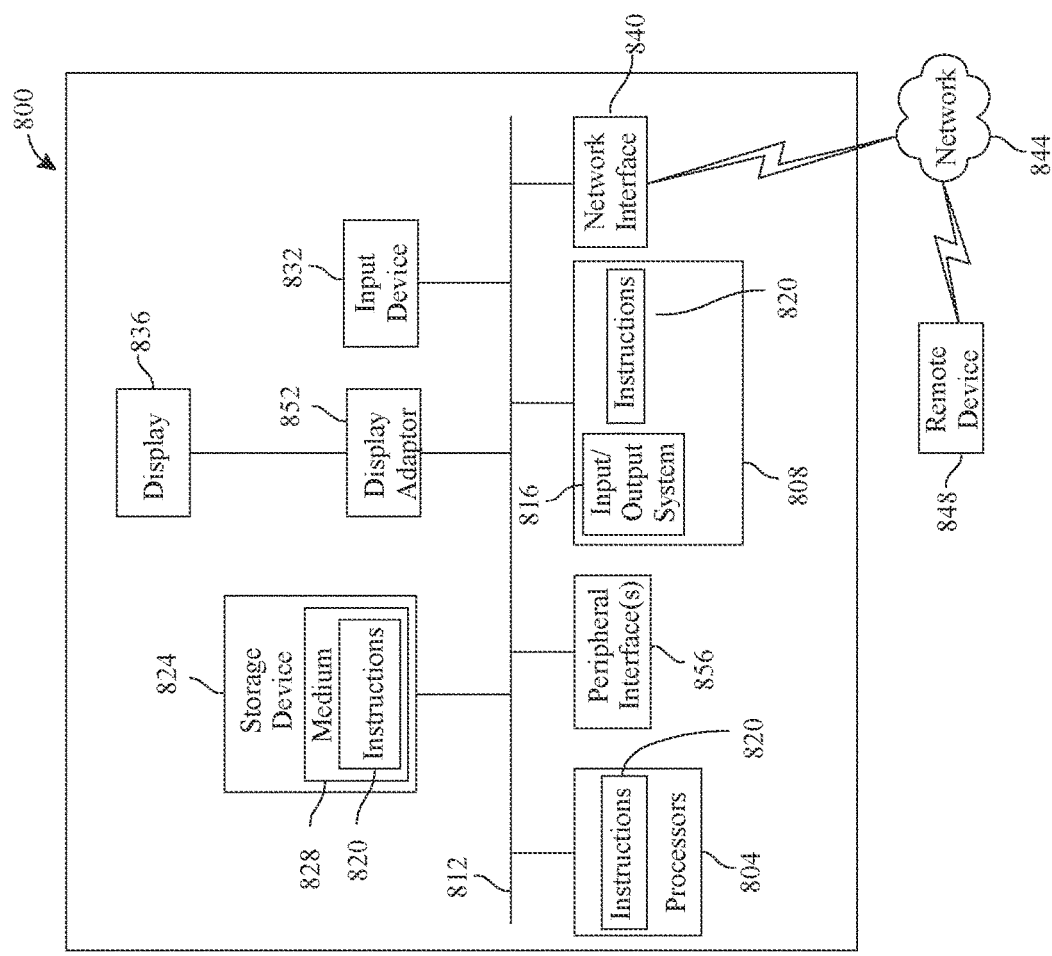
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and memory 808 that communicate with each other, and with other components, via a bus 812. Bus 812 may include any of several types of bus structures including, but not limited to, memory bus, memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for determining action guides, wherein the apparatus comprises:
   at least a processor; and
   a memory communicatively connected to the at least a processor, wherein the memory contains instructions configuring the at least a processor to:
      receive a user action, wherein the user action comprises a user usage;
      convert the user usage of the user action into a current usage;
      obtain action template data, wherein the action template data comprises a template usage configured to determine a relevancy score corresponding to a relevancy strength of data from a web crawler function;
      generate training data, wherein the training data comprises a template action expectation as a function of the user action and the action template data;
      determine an action feasibility as a function of the current usage and the template action expectation, wherein determining the action feasibility comprises: iteratively training a machine learning model as a function of the training data, wherein iteratively training the machine learning model further comprises:
         using the training data applied to an input layer of nodes comprising a plurality of data entries of user action and action template data inputs, one or more intermediate layers of nodes, and an output layer of nodes comprising a plurality of template action expectation, action feasibility, and action guide outputs;
         updating the outputs based on an error function iteratively, wherein an error function value is evaluated in training iterations and compared to a threshold;
         comparing an output generated by the machine learning model to an input in the training data;
         adjusting one or more connections between nodes in adjacent layers of the machine learning model as a function of weighted sums of the inputs;
         detecting a scoring function between the output layer of nodes and the input layer of nodes;
         determining a correlation between the output layer of nodes and the input layer of nodes;
         updating the training data as a function of the scoring function; and
         retraining the machine learning model as a function of the scoring function; and
      generate an action guide as a function of the action feasibility.

2. The apparatus of claim 1, wherein:
the user action further comprises a user action expectation; and
the memory contains instructions further configuring the at least a processor to generate the template action expectation as a function of the user action expectation and the action template data.

3. The apparatus of claim 1, wherein the user usage comprises a time usage.

4. The apparatus of claim 1, wherein the memory contains instructions further configuring the at least a processor to:
obtain usage weights of a first current usage and a second current usage; and
calculate the current usage, wherein the current usage comprises a sum of a first current usage and a second current usage that are converted respectively from a first user usage and the second user usage using the usage weights.

5. The apparatus of claim 1, wherein the template action expectation comprises a positive expectation, wherein the positive expectation comprises a positive expectation weight.

6. The apparatus of claim 1, wherein the template action expectation comprises a negative expectation, wherein the negative expectation comprises a negative expectation weight.

7. The apparatus of claim 6, wherein the memory contains instructions further configuring the at least a processor to determine the action feasibility using a feasibility threshold, wherein the feasibility threshold is compared with the negative expectation to determine the action feasibility.

8. The apparatus of claim 1, wherein the memory contains instructions further configuring the at least a processor to generate an action abandonment of the action guide when the action feasibility is below a guide threshold.

9. The apparatus of claim 8, wherein the memory contains instructions further configuring the at least a processor to generate an action redirection of the action guide when the action feasibility is above the guide threshold.

10. The apparatus of claim 1, wherein the memory contains instructions further configuring the at least a processor to:
receive a rejection of a first action guide from a user; and
generate a second action guide as a function of the rejection.

11. A method for determining action guides, wherein the method comprises:
receiving, using at least a processor, a user action, wherein the user action comprises a user usage;
converting, using the at least a processor, the user usage of the user action into a current usage;
obtaining, using the at least a processor, action template data, wherein the action template data comprises a template usage configured to determine a relevancy score corresponding to a relevancy strength of data from a web crawler function;
generating training data, using the at least a processor, wherein the training data comprises a template action expectation as a function of the user action and the action template data;
determining, using the at least a processor, an action feasibility as a function of the current usage and the template action expectation, wherein determining the action feasibility comprises:
iteratively training a machine learning model as a function of the training data, wherein iteratively training the machine learning model further comprises:
using the training data applied to an input layer of nodes comprising a plurality of data entries of user action and action template data inputs, one or more intermediate layers of nodes, and an output layer of nodes comprising a plurality of template action expectation, action feasibility, and action guide outputs;
updating the outputs based on an error function, wherein an error function value is evaluated in training iterations and compared to a threshold;
comparing an output generated by the machine learning model to an input in the training data;
adjusting one or more connections between nodes in adjacent layers of the machine learning model as a function of weighted sums of the inputs;
detecting a scoring function between the output layer of nodes and the input layer of nodes;
determining a correlation between the output layer of nodes and the input layer of nodes;
updating the training data as a function of the scoring function; and
retraining the machine learning model as a function of the scoring function; and
generating, using the at least a processor, an action guide as a function of the action feasibility.

12. The method of claim 11, further comprising:
generating, using the at least a processor, the template action expectation as a function of a user action expectation of the user action and the action template data.

13. The method of claim 11, wherein the user usage comprises a time usage.

14. The method of claim 11, further comprising:
obtaining, using the at least a processor, usage weights of a first current usage and a second current usage; and
calculating, using the at least a processor, the current usage, wherein the current usage comprises a sum of a first current usage and a second current usage that are converted respectively from a first user usage and the second user usage using the usage weights.

15. The method of claim 11, wherein the template action expectation comprises a positive expectation, wherein the positive expectation comprises a positive expectation weight.

16. The method of claim 11, wherein the template action expectation comprises a negative expectation, wherein the negative expectation comprises a negative expectation weight.

17. The method of claim 16, further comprising:
determining, using the at least a processor, the action feasibility using a feasibility threshold, wherein the feasibility threshold is compared with the negative expectation to determine the action feasibility.

18. The method of claim 11, further comprising:
generating, using the at least a processor, an action abandonment of the action guide when the action feasibility is below a guide threshold.

19. The method of claim 18, further comprising:
generating, using the at least a processor, an action redirection of the action guide when the action feasibility is above the guide threshold.

20. The method of claim 11, further comprising:
receiving, using the at least a processor, a rejection of a first action guide from a user; and generating, using the at least a processor, a second action guide as a function of the rejection.

\* \* \* \* \*